US012406555B2

(12) United States Patent
Cohen et al.

(10) Patent No.: US 12,406,555 B2
(45) Date of Patent: Sep. 2, 2025

(54) SYSTEM AND METHOD FOR PROVIDING A DICTIONARY-BASED ELECTRONIC GAMING SYSTEM

(71) Applicants: Gregory J. Cohen, Sunnyvale, CA (US); Mark C Nicely, Daly City, CA (US)

(72) Inventors: Gregory J. Cohen, Sunnyvale, CA (US); Mark C Nicely, Daly City, CA (US)

( * ) Notice: Subject to any disclaimer, the term of this patent is extended or adjusted under 35 U.S.C. 154(b) by 241 days.

(21) Appl. No.: 17/952,019

(22) Filed: Sep. 23, 2022

(65) Prior Publication Data

US 2023/0177929 A1 Jun. 8, 2023

Related U.S. Application Data

(63) Continuation-in-part of application No. 17/402,501, filed on Aug. 14, 2021, now abandoned, which is a continuation of application No. 17/097,804, filed on Nov. 13, 2020, now Pat. No. 11,495,095, which is a continuation-in-part of application No. 16/041,837, filed on Jul. 22, 2018, now Pat. No. 10,839,653, which is a continuation of application No. 15/184,361, filed on Jun. 16, 2016, now Pat. No. 10,032,340.

(60) Provisional application No. 63/247,755, filed on Sep. 23, 2021.

(51) Int. Cl.

| | |
|---|---|
| *G07F 17/32* | (2006.01) |
| *A63F 3/04* | (2006.01) |
| *G07F 17/34* | (2006.01) |

(52) U.S. Cl.

CPC .......... *G07F 17/34* (2013.01); *G07F 17/3213* (2013.01); *G07F 17/3262* (2013.01); *G07F 17/3274* (2013.01); *A63F 2003/0426* (2013.01)

(58) Field of Classification Search

None

See application file for complete search history.

(56) References Cited

U.S. PATENT DOCUMENTS

| | | | |
|---|---|---|---|
| 6,428,412 B1 * | 8/2002 | Anderson | G07F 17/32 463/16 |
| 2011/0105217 A1 * | 5/2011 | Haveson | G07F 17/3223 463/43 |
| 2015/0190708 A1 * | 7/2015 | Hoyt | G07F 17/3295 273/272 |

* cited by examiner

*Primary Examiner* — Damon J Pierce

(74) *Attorney, Agent, or Firm* — Newman Law, LLC

(57) ABSTRACT

Specialized gaming systems and methods for providing secure gaming features in which payouts are based upon the presence and identification of patterns of letters within an arrangement of letters, said pattern matching a word or phrase within a pre-defined dictionary.

23 Claims, 16 Drawing Sheets

Fig. 9
GoldenWord
GAME MODES
MAIN GAME PLAY
GRID SIZE 5x5 LETTERS
PLAYER CIRCLES WORDS
MIN 4-LETTER WORD TO PLAY
CAN TRIGGER THE FREE GAMES BONUS
FREE GAME PLAY
GRID SIZE 6x5 LETTERS
GAME AUTO CIRCLES WORDS
MIN 3-LETTER WORD TO PLAY
CAN AWARD ADDITIONAL FREE GAMES
E I I S I
T W V S E
A O R A D
V N N B E
U I Qu E R
I D E C S H
S W D A F L
E O T O A Z
N P J R I O
O A A D K O

Fig. 13

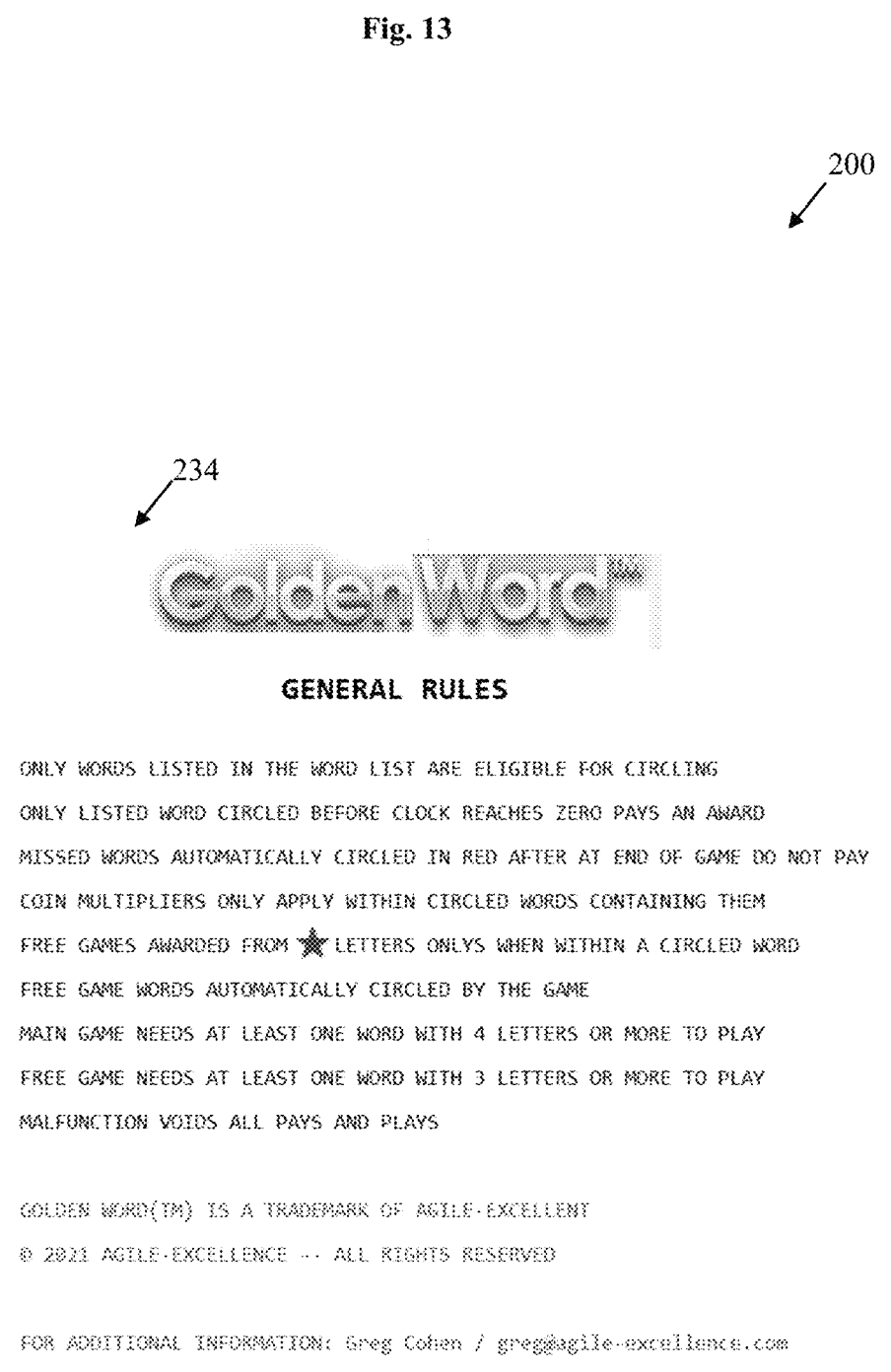

200

234

GoldenWord™

GENERAL RULES

ONLY WORDS LISTED IN THE WORD LIST ARE ELIGIBLE FOR CIRCLING

ONLY LISTED WORD CIRCLED BEFORE CLOCK REACHES ZERO PAYS AN AWARD

MISSED WORDS AUTOMATICALLY CIRCLED IN RED AFTER AT END OF GAME DO NOT PAY

COIN MULTIPLIERS ONLY APPLY WITHIN CIRCLED WORDS CONTAINING THEM

FREE GAMES AWARDED FROM ★ LETTERS ONLYS WHEN WITHIN A CIRCLED WORD

FREE GAME WORDS AUTOMATICALLY CIRCLED BY THE GAME

MAIN GAME NEEDS AT LEAST ONE WORD WITH 4 LETTERS OR MORE TO PLAY

FREE GAME NEEDS AT LEAST ONE WORD WITH 3 LETTERS OR MORE TO PLAY

MALFUNCTION VOIDS ALL PAYS AND PLAYS

GOLDEN WORD(TM) IS A TRADEMARK OF AGILE-EXCELLENT

© 2021 AGILE-EXCELLENCE -- ALL RIGHTS RESERVED

FOR ADDITIONAL INFORMATION: Greg Cohen / greg@agile-excellence.com

SYSTEM AND METHOD FOR PROVIDING A DICTIONARY-BASED ELECTRONIC GAMING SYSTEM

CROSS-REFERENCE

This patent application is a continuation-in-part of U.S. patent application Ser. No. 17/402,501 filed on Aug. 14, 2021, which is a continuation of U.S. patent application Ser. No. 17/097,804 filed on Nov. 13, 2020, which is a continuation-in-part of U.S. patent application Ser. No. 16/041,837 filed on Jul. 22, 2018 (now U.S. Pat. No. 10,839,653) which is a continuation of U.S. patent application Ser. No. 15/184,361 filed on Jun. 16, 2016 (now U.S. Pat. No. 10,032,340), all of which are hereby incorporated by reference.

FIELD OF INVENTION

The present disclosure relates to gaming systems and devices. More particularly, the present disclosure is a method and system in which payouts are based upon the presence and identification of patterns of letters within an arrangement of letters, said pattern matching a word or phrase within a pre-defined dictionary. In some embodiments, the player must perform the identification within a limited amount of time in order to receive a prize.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Video-based gaming machines, such as slot machines, are well known and enjoyed. Casino games, including slot machine games, video poker games, video keno games, or video blackjack games are an important source of income for the gambling industry. Accordingly, casinos (including brick-and-mortar and online casinos) constantly search for new gaming strategies and features to provide additional incentives for players to continue to play and to distinguish play at their establishments from competitors in the industry.

Further limitations and disadvantages of conventional approaches will become apparent to one of skill in the art through comparison of described systems with some aspects of the present disclosure, as set forth in the remainder of the present application and with reference to the drawings.

SUMMARY OF THE INVENTION

Some embodiments of the invention are directed to a system of providing a wagering game in which at least some payout is based on the formation of letter patterns that match entries in a dictionary of winning letter patterns, the system comprising: a display device; a user interface for receiving player inputs; a first processor configured for game outcome generation and random number generation; a first tangible memory for storage of game outcome data; a first tangible, non-transitory, memory configured to communicate with the first processor, said first tangible, non-transitory, memory having instructions stored thereon in response to execution by the first processor, cause the first processor to perform operations comprising: selecting at random a plurality of letters; associating the selected plurality of letters with a plurality of letter display elements; evaluating said association of letters relative to filtering rules for acceptable game outcomes; responding to the results of said evaluation of filtering rules; responsive to identifying a game outcome eligible for play, storing game outcome data into said first game outcome memory; a second processor configured for gameplay; and a second memory for storing game outcome data; a second tangible, non-transitory, memory configured to communicate with the second processor, said second tangible, non-transitory, memory having instructions stored thereon in response to execution by the second processor, cause the second processor to perform operations comprising: maintaining a player balance of funds available for wagering; receiving a request to begin play; deducting the value of the bet placed from said player balance; displaying a game outcome; selecting a game outcome from said second game data memory; evaluating said game outcome for the presence of one or more a first payout pattern; if said outcome has no said first payout patterns, displaying a corresponding message to the player and ending the game; else proceeding with the demarcation of said one or more first payout patterns, calculating earned payouts; updating said player balance accordingly; and displaying a corresponding message to the player and ending the game.

In some embodiments of the aforementioned system, said first processor and its corresponding first tangible, non-transitory, memory and said second processor and its corresponding second tangible, non-transitory, memory are located in the same computer cabinetry.

In some embodiments of the aforementioned system, said first processor and its corresponding first tangible, non-transitory, memory and said second processor and its corresponding second tangible, non-transitory, memory are located in the separate computer cabinetry.

In some embodiments of the aforementioned system, said game outcome generation is completed prior to receiving said request to play.

In some embodiments of the aforementioned system, said game outcome generation is completed after receiving said request to play.

In some embodiments of the aforementioned system, said second processor performs the process of evaluating one or more Secondary-Indicia on said display elements.

In some embodiments of the aforementioned system, said evaluating one or more Secondary-Indicia results in the activation of a secondary event.

In some embodiments of the aforementioned system, said evaluating one or more Secondary-Indicia results in an increase in said earned payouts.

In some embodiments of the aforementioned system, said first process further comprises performs the process of associating a Secondary-Indicium to at least one display element In some embodiments of the aforementioned system, said filtering rules further comprises at least one of the following: exclusion of letter patterns found in an exclusion dictionary; exclusion of letter patterns forming inadvertent text; exclusion of letter patterns based on directional ambiguity; exclusion of letter patterns based on word-length ambiguity; and exclusion of game outcomes based on their total payout value.

In some embodiments, the exclusion patterns are dynamically evaluated based on the winning letter patterns present. For example if the word "home" appears forward and is therefore on the wordlist, we have to look to see if the pattern "emoh" shows up forward because that would be spell "home" backwards and be confusing to the player.

In some embodiments of the aforementioned system, said first processor also performs the process of identifying the presence of payout patterns along the display elements relative to a first dictionary of payout-eligible phrases; storing additional data regarding said payout patterns with the data stored for said first game outcome.

In some embodiments of the aforementioned system, said second processor performs the process of evaluating said game outcome for the presence of one or more a first payout pattern based upon additional data stored with said game outcome.

In some embodiments of the aforementioned system, said second processor performs said demarcation of said payout patterns without additional player input.

In some embodiments of the aforementioned system, said second processor performs includes the process of displaying a list of the text of the available payout text, and said demarcation of said payout patterns if and as directed by the player by accepting inputs from said player user interface.

In some embodiments of the aforementioned system, the gaming system limits the amount of time available for accepting payout pattern demarcation input from the player, where after said amount of available time is expired, the gaming system stops accepting payout pattern demarcation input from the player and proceeds with the process of calculating said payouts relative to the payout patterns successfully demarked.

In some embodiments of the aforementioned system, the second game outcome data memory is comprised of hardware used for the first game outcome data memory.

In some embodiments of the aforementioned system, said gaming system selects the order in which payout patterns are demarked relative to specific ordering rules.

In some embodiments of the aforementioned system, said specific ordering rules are based on the positioning of the payout patterns on the display elements relative to the outside boundary of the display elements.

In some embodiments of the aforementioned system, said specific ordering rules are based on reducing the overall distance between the payout patterns.

In some embodiments of the aforementioned system, said gameplay performed by said second processor is the primary gaming proposition.

In some embodiments of the aforementioned system, said gameplay performed by said second processor is a secondary gaming proposition bonus associated with a different primary gaming proposition.

In some embodiments of the aforementioned system, said different primary gaming proposition is a slot game.

In some embodiments of the aforementioned system, said different primary gaming proposition is a video poker game.

In some embodiments of the aforementioned system, said different primary gaming proposition is a video keno game.

In some embodiments of the aforementioned system, said secondary gaming proposition bonus generates payouts for a plurality of players.

These features and advantages of the present disclosure may be appreciated by reviewing the following description of the present disclosure, along with the accompanying figures.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIGS. 1-13 provide exemplary display screens provided by some embodiments of systems and methods of the invention, which as described herein, illustrate various features of such embodiments;

DETAILED DESCRIPTION OF THE INVENTION

Figure 1:
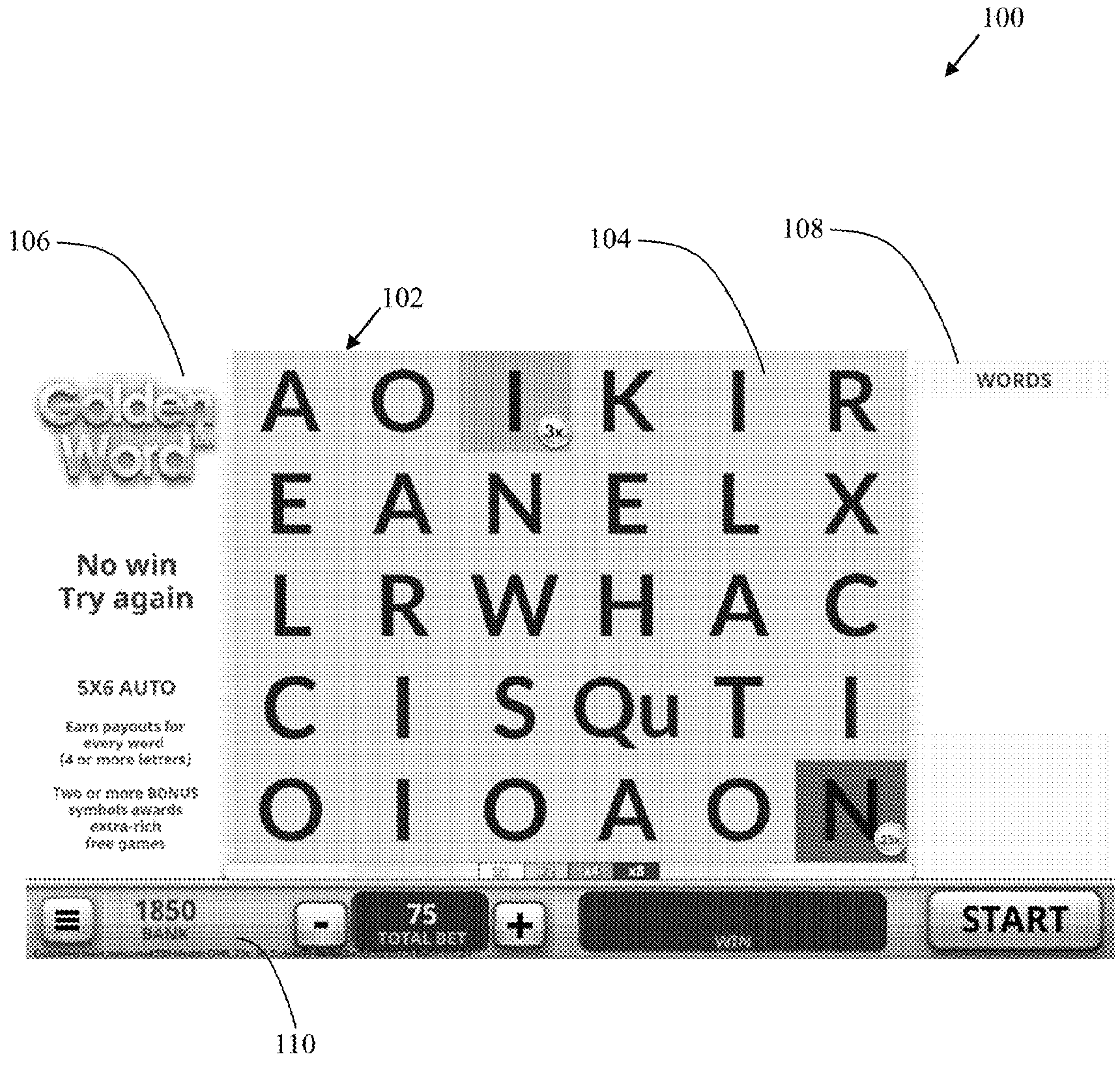

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems of the invention may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment. Any item referenced herein but not included, including games and patent documents, such as US patents or patent publications, are incorporated herein by reference.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The following provides a more detailed description of embodiments of the present invention. In this description, circuits and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of functions between various blocks are exemplary of a specific implementation. It will be readily apparent to one of ordinary skill in the art that the present invention may be practiced by numerous other partitioning solutions.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a reverse sequence, or one or more parallel process streams. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM and Flash memory.

Formatting Notes

Paragraph text in italicized font represents the name of game, product, or game feature, typically protected by a trademark or registered trademark of that game's manufacturer and/or licensor. British-style punctuation around closing parenthesis and quotation marks is used for utmost clarity. Sub-section headings are used for convenience and not to be construed as limiting of the scope or substance of this disclosure.

Class III and Class II

Video-based gambling games typically fall within two broad regulatory categories: (a) Class III ("Class III") and (b) Class II ("Class II"). The present disclosure can be applied to both categories of gaming.

Class III devices are often referred to as "Vegas-Style" games and are noted by having purely random game outcomes determined on the fly and independent of prior outcomes. These are the devices found in casinos in the major traditional gaming jurisdictions such as Nevada, Atlantic City (New Jersey), Mississippi, Ontario (Canada). Comparable regulations apply to jurisdictions such as Atlantic City (New Jersey), Connecticut, and Ontario (Canada) which permit online cash-based gambling.

Class II devices, which can be found in certain Native American Casinos in North America whose jurisdictions do not allow "Vegas-style" Class III devices, do not directly and randomly generate game outcomes. Rather, Class II devices usually use an indirect method for outcome selection based upon (a) multi-player bingo; or (b) pull-tabs (whether physical or electronic). In the case of bingo-based outcomes, game outcomes displayed to the player, such as a slot game display, are mapped from the bingo card pattern associated with that game display. In the case of pull-tab-based outcomes, all game outcomes are predetermined by the game provider, similar to how a state lottery will preprint one set of outcomes for a scratcher game. Similar to a scratcher game, the predetermined outcomes for a given pull-tab-based Class II game are randomized, and once a given outcome is sold to a player that particular outcome is removed from the pool of available outcomes. Relative to the specific implementation, an additional randomization step may be applied in terms of the selection of groups of outcomes and/or each specific outcome from the same pool.

Electronic Gaming Machine ("EGM")

Video-based gaming devices are referred to in the casino industry as Electronic Gaming Machines ("EGMs"). The typical Class III EGM found in a Las Vegas casino is a stand-alone device insofar as the outcome generation, evaluation, and game display all occur within the same physical cabinet. The present disclosure also applies to EGMs with distributed hardware, which includes Class II video lottery terminals, Class II central determination systems, casino-based mobile client/central casino server gaming, general mobile-based client/central server gaming, as well as general internet-based gaming.

The primary distinction between a stand-alone EGM and a distributed EGM is whether the gaming outcome is generated on the same hardware which houses the game result display.

Outcome Generation

Outcome generation is also fundamental in whether a video-based gambling game conforms to Class II or Class III requirements. In general, a Class II game requires the use of pre-defined outcomes ("Pre-Defined Outcome"). A Pre-Defined Outcome is typically generated by the game software provider as part of the game design process. Each time such a game is played in the casino, one of the Pre-Defined Outcomes is randomly selected for the player. More specifically, only certain outcomes are defined and available in the pool of pull-tab outcomes that can be awarded; and only certain outcomes are associated with certain bingo-game results.

Pre-Defined Outcomes are used in some Class III games, but typically only for bonus rounds, especially for text-based bonus rounds in games like Wheel of Fortune and Trivial Pursuit. However, the majority of Class III outcomes are Just-In-Time Outcomes ("Just-In-Time Outcomes") which means that each game outcome is generated by the EGM in real-time and only after the player has committed their bet.

In general, a gambling game outcome is based upon the random selection of a certain number of elements ("Outcome Elements") whose selection is evaluated relative to game rules. Games that use Pre-Defined Outcomes typically involve the specification of all of the Outcome Elements associated with each outcome. On the other hand, for Just-In-Time Outcomes, a selection of Outcome Elements occurs independently within the same outcome.

Examples of Outcome Elements displayed within EGM games include depictions of the rotational position of a face-on wheel with values displayed on the periphery relative to a pointer used for a video Money-Wheel game; dice used for games like video-craps and sic-bo; playing cards used for games like video-poker and video-blackjack; and "slot symbols" used in assorted slot games.

For video poker, the Outcome Elements are typically (at least) 52 unique cards from which (at least) one 5-card poker hand is generated. In most video-based card games like video poker, video blackjack, video baccarat, etc., the selection of cards replicates the reality of a physical deck of cards insofar as when a given card, (say the Ace of Hearts) is dealt from a deck of cards, this particular card is removed from the remaining card selections for the remainder of the game. This is often referred to as selection-without-replacement.

For 3-reel slots, the Outcome Elements are symbols on a fixed strip of symbols on each of 3 rotating reels. The Outcome Elements which can appear within the same column of a given reel are typically restricted to pre-defined ordering of the symbols on that reel's reel strip.

In some slot games, such as IGT's Treasure of Troy, there is a separate reel strip for each Outcome Element symbol which forms the final outcome.

In some slot machines, like Bally Gaming's Cash Meteor, some other animation mechanism is used to reveal final outcome symbols at each final symbol position. Such animations are sometimes referred to as glyphs. In some slot machines, like R. Franco's Alice Through the Looking Glass or IGT's Diamond Galaxy, each final outcome symbol initially appears in some other position on the playfield and subsequently moves with animation into its final location. With slot machines like these without reel strips or reel-strip animation, it is not obvious to the player how the final symbols are being selected. For example, do the symbols within a given column correspond to a pre-defined array of symbols as is done with traditional slot machines? Or is each symbol selected independently of all other symbols within the same column and do the odds of selection change between columns? Or is each symbol selected without replacement from the equivalent of a deck of cards?

In some slot machines, such as IGT's/High 5 Gaming's Da Vinci Diamonds or WMS's Invaders from Planet Moolah, the final Outcome Elements appear like a traditional slot Game-Grid of symbol, but the animation does not rely upon a depiction of a rotating reel. Rather, each Outcome Element symbol moves from the top of the playfield display down into its final position. This animation is more than just a unique outcome formation technique. Rather, it helps support and convey a related play feature associated with such animations. Specifically, in games like this, after a winning outcome is formed, identified, and paid, the Outcome Elements which form the winning pattern are removed from the screen, and additional Outcome Elements fall downward to fill in the newly created games such as is found in popular match-3 video games like Bejeweled or Candy Crush. Though industry insiders are aware that the symbols in these types of games typically come from pre-defined vertical arrays of symbols, this is a functional requirement and thus the actual generation mechanism may not be obvious to the player.

Bonus Rounds

A bonus event feature ("Bonus Event") is well known in gaming machines. A Bonus Event usually provides an additional award to the player and does not require an additional wager by the player to be activated. Bonus Events are generally activated or triggered upon an occurrence of a designated triggering symbol or triggering symbol combination in the primary or base game. For instance, a bonus symbol occurring on the Payline on the third reel of a three-reel slot machine may trigger a Bonus Event.

In some games, whilst playing a Bonus Event, an outcome can occur which awards additional play of the same Bonus Event. For example, a very popular Bonus Event awards the player with a number of rounds of free play a richer version/variation of the main game. In many of these types of Bonus Events, a given round of free play can generate an outcome that awards a certain number of additional rounds of free play—this is often referred to as a Bonus Event retrigger or retriggering.

In some games, whilst playing a first Bonus Event, a secondary Bonus Event can be triggered. In some games, the secondary Bonus Event is played only after the primary Bonus Event completes. In some games, when a secondary Bonus Event is triggered, the primary Bonus Event is paused, then the secondary Bonus Event is played, afterward, the primary Bonus Event is resumed.

When a secondary or bonus round is triggered, the gaming machine generally indicates this to the player through one or more visual and/or audio output devices, such as the reels, lights, speakers, and video screens.

Interactivity

For the vast majority of slot games, the main or primary game is a non-interactive experience for the player. After selecting wager size and/or wager configuration, the player's only decision is whether or not to play; the player's only input is to activate a new play of the game. In the case of games with AUTOPLAY functionality, a given player also has the option to activate a series of plays of their given game and if so activated, the option to subsequently disable the completion of said series if the entire series has not already been played out and if the series has not terminated due to a terminating event such as insufficient balance; triggering of a bonus; triggering of an especially large award or any other terminating event defined by said given game.

Many secondary or bonus games, on the other hand, are known to offer varying amounts of player interactivity. In some bonus game implementations, the player must press a button or touch the display screen in order to start the bonus play. In some bonus game implementations, the player must make blind selections or picks in order to reveal prizes and/or to progress with the bonus game. In some bonus implementations, the player is offered additional gambling propositions in which the player can optionally participate. In some bonus implementations, the player is provided the choice of play experience. In some bonus implementations, the player is provided the choice of bonus play attributes such as choosing a specific combination of free spins at a certain award multiplier or from a certain range of award multipliers. In some bonus implementations, the player is provided with an opportunity to control a video game, the outcomes of which lead to varying prize revelations. In some Class III bonus implementations, the player is required to make strategic selections that can affect their bonus outcome such as selecting whether the next unrevealed standard playing card has a rank higher or lower than the rank of the most-recently revealed standard playing card.

Recently, some US gaming jurisdictions have adopted regulation and policy updates to better address the issue of the use of non-strategic skill ("Game Skill") in games of chance. Such Game Skills could include hand-eye-coordination skills (sometimes referred to as "Twitch Skill"), such as is required to play video games such as Pong or Breakout. Alternately or additionally, such non-strategic skills could include puzzle-solving skills (which we'll refer to as "Puzzle Skill") not directly related to a gambling proposition selection, such as required to play video games such as Trivial Pursuit or Boggle. Video games such as Tetris and Missile Command require a combination of Twitch Skill and Puzzle Skill.

Return to Player (RTP) and its Control in Skill Games

Every Class II and Class III gambling game can be mathematically characterized in terms of its mathematical Expected Value. Known in the gaming industry as “payback percentage”, “return to player”, or simply “RTP”, the mathematically expected value for a given game reflects its long-term expected ratio of (awards paid out)/(wagers taken in). For a given Class II pull-tab or electronic-pull-tab game, as well as for a fixed pool of lottery scratch-off tickets, the RTP across the entire pool of tickets is known exactly. For any other given gambling game, the actual RTP tends towards the theoretical RTP over long-term play across multiple players. In other words, the more plays of a given game at a given wager size, the more likely the actual RTP of that game will converge to its theoretical RTP.

Some gaming jurisdictions define limitations as to how much actual RTP can be reduced by lack of player Game Skill. For example, New Jersey Gaming requires that an EGM with a Game Skill Payout feature not have an actual RTP lower by more than 4% of theoretical RTP after a defined amount of cash play. Alternately/additionally, gaming jurisdictions typically establish minimum RTP limits for EGM in general. If a given EGM consistently fails to meet that minimum, it would be in violation of such restrictions and subject to being forced to discontinue operation.

Therefore, there is a need to be able to limit the impact of less-than-adequate player skill in casino games with Game Skill on overall EGM RTP. It should be noted that to maintain overall actual RTP on a given EGM, it may be acceptable for some player(s) to lose a portion of their Payouts from their inadequate Game Skill as long as such under-payments are eventually paid to some other player(s).

Similarly, casino operators are especially focused on optimizing their revenue by the selection and placement of RTP for each of their EGMs. In most EGM games, the manufacturer provides for multiple versions of each game title, each version with a different theoretical RTP. This is a traditional retail pricing optimization. Charge too much (offer too low of an RTP), customers (players) won’t buy (play). Charge too little (offer too high of an RTP), customers (players) won’t be generating profits for the casino that they might have otherwise. Therefore, casino operators have a financial interest in making sure that RTP available to a given player on a given EGM is not significantly below the casino’s target RTP limit.

Additionally, it is often the case that a given player’s skill, in a game with any type of skill component, increases with experience. This is especially true for novice players who have little or no experience with a particular game. Therefore, this is a need to be able to limit the impact of less-than-adequate player skill in casino games with Game Skill on overall EGM RTP. Within the casino industry, this is sometimes referred to as a Novice Guardrails (“Novice Guardrail”).

Other EGM Objectives—Paylines and Gambling Relevance

Though slot machines are extremely popular for both cash and non-cash play, the casino industry is well aware of some long-standing complaints from slot players, including (a) confusion as to why certain patterns of slot symbols pay while other, similar patterns do not; and (b) the typical lack of meaningful player interactivity in most slot games.

The former issue is part-and-parcel with the advent of slot games with 4 or more reels, and with many more ways to win than traditional slot machines with 3 mechanical reels with a very limited number of ways to win, namely, when matching symbols align along a single line (“Payline”) or a very limited number of Paylines (such as 3 horizontal Paylines, or 3 horizontal Paylines and two diagonal Paylines).

For typical 3-reel games with up to 5 Paylines, each Payline forms a single straight line across the reels. 3-reel games with more Paylines, such as 9 Paylines, require bent lines for the additional Paylines. For other slot games with 4 or more reels, the majority of the Paylines require one or more bends between the first and last reel strip.

There are other classes of games with 4 or more reels that do not use explicit Paylines such as IGT games with Multi-Way pays and Aristocrat games with Reel Power pays with win patterns based solely on symbols appearing in any position on contiguous reels. IGT markets its multiway games featuring 5-reels each displaying 3-symbols high, as “243 ways to win” because 3-high×3-high×3-high×3-high×3 high=243 possible combinations. Similarly, IGT markets its multiway games featuring 5-reels each displaying 4-symbols high, as “1024 ways to win” because 4-high×4-high×4-high×4-high×4 high=1024 possible combinations.

In general, for a game with a given set of reel strips, the greater the number of ways to win, the greater the chance for some Payout and the corresponding excitement, but also the greater the chance that the player might not understand why seemingly comparable outcomes do not pay the same.

The latter issue is a primary driver for the increase in slot machines with one or more Game Skill components. Unfortunately, such games have not proven to be as successful as anticipated. Some explanations have been offered within the casino industry as to the cause of the limited success. One such theory is that the more specialized the skill required for a Game Skill feature, the smaller the potential audience of competent players. Alternately, if the Game Skill feature is trivial, such as just pressing a button quickly, the level of mental engagement is significantly lower.

Another explanation is that the Game Skill action is often too far removed from the Payout excitement provided by traditional primary games and/or bonus games.

The present invention provides solutions to both of these issues while providing the novelty and gambling satisfaction needed in the marketplace.

Other General Definitions

Primary-Indicum: This identifies an Outcome-Element with respect to the sole or primary game outcome evaluation. Examples include pips on a die, suit and rank on a playing card, and a symbol used in a slot game.

Secondary-Indicum: Some games provide a secondary visual identifier on some (though usually not all) Outcome-Elements, for the purpose of a secondary outcome evaluation. Within slot machine games, such an indication can appear as a miniature additional image applied to some of the regular game symbols. For example, in the IGT/High-5 Gaming slot game Hoot Loot, a symbol (Primary-Indicum) with a small owl-face image on the corner of the symbol and a gold border surrounding the symbol (Secondary-Indicum) makes that symbol eligible for a secondary Payout evaluation. Within games like this, a Secondary-Indicum is often referred to as a sub-symbol ("Sub-Symbol"). In some games with Sub-Symbols, a given symbol in a particular position on a particular reel strip is assigned a Sub-Symbol. This is necessarily true with physical reel strips on electro-mechanical slot machines. This would be a Pre-Defined Assignment. In some other games with Sub-Symbols, a given symbol may or may not be randomly assigned a Sub-Symbol just for one play of the game. This would be a Just-In-Time Assignment.

Payout: Monetary or credit pays associated with the occurrence of a defined outcome.

Total-Bet Payout: Payout from a Payout opportunity which is relative to the Total-Bet (defined below).

Basis-Bet Payout: Payout typically from one of a plurality of Payout opportunities (such as from one Payline, or one Multiway Win Way, or one hand of cards, in games with multiples of each, respectively) relative to the Basis-Bet (defined below). In the case of a game with only a single Payout opportunity, such as an old-style 3-reel slot machine with a single Payline, or a traditional video poker game with a single hand, the Basis-Bet Payout is equivalent to the Total-Bet Payout.

Overall Payout: sum of all Payouts generated by the single play of a game.

Win: when an Overall Payout exceeds the Overall Bet placed on the game which generated that Payout.

Push: when an Overall Payout equals the Overall Bet placed on the game which generated that Payout.

Sub-Push Hit: when an Overall Payout is at least one Bet Unit but less than the Overall Bet placed on the game which generated that Payout.

Paytable: Listing of the Payouts defined for a given game. Typically posted on the EGM and/or available on a player-visible in-game screen.

Denomination/Credit/Pay-Unit/Bet-Unit: Refers to the lowest monetary unit of betting and of Payout within a given gambling game. In most EGMs in the US, each unit of denomination is referred to as a "Credit" and values such as balance, bet, and winning are expressed as a number of Credits. For example, in an EGM game with a 25 cent denom, a 75 cent bet is usually expressed as a bet of "3".

Total-Bet: The entirety of a wager placed on a given game.

Basis-Bet: The portion of the Total-Bet that gets applied to the Basis-Bet Payouts defined for a game. For example, in most slot games with Payline Payouts, the Total-Bet=number of Paylines times Basis-Bet. (In these games, the Basis-Bet is often referred to as a "line bet" or "coin value".) On the other hand, in most slot games with Multi-way/Reel-Power Payouts, the Total Bet is much less than the number of Win-Ways times Basis-Bet. For example, many versions of the popular Aristocrat game, Buffalo, offer 1024 "ways to win" for a 40 cents bet (or an integer multiple of 40 cents). When played at 40 cents, the Basis-Bet (also referred to as "coin value") is 1 cent. In other words, for this game, the Basis-Bet=Total-Bet/40. The "40" value is selected by the game manufacturer relative to the Paytable and game math design.

Random-Selection/Randomly-Selected: describes the selection of a single Outcome-Element or Pre-Defined-Outcome from a plurality of such items based on a random process. In EGMs, the randomness is provided via a software process commonly referred to as a Random Number Generator ("RNG") whose purpose is to generate random values within a specified range in a manner that cannot be readily predicted outside of the system, such as by a slot machine player. Technically, such a process would be more accurately described as a pseudo-random number generator ("pRNG") because even though the resulting game outcomes are externally unpredictable, the underlying software is deterministic, but in the casino industry and video-game industry, the term RNG is the preferred term but with the understanding that implementation is via a pRNG.

Progressive Jackpot: refers to a Payout that can grow during play based on such things as time, bets placed on a given player's EGM, bets placed by other players on other EGMs, certain outcomes that occur on a given player's EGM, certain outcomes that occur on other players EGMs, etc. Typically, when a Progressive Jackpot is awarded to more players, the value of this Progressive Jackpot immediately resets to a starting value, usually referred to as a seed or seed value.

Embodiment-Specific Definitions

Embodiments of the invention are generally based upon a game format described in U.S. Pat. Nos. 10,032,340 and 10,839,653, consisting of a sequence of letters ("Game-Letter") which appear with certain physical dimensions ("Game-Tile") on a display device in certain locations of the display device ("Game-Grid").

Game-Tile: the primary type of Outcome-Element

Game-Letter: the Primary-Indicum of a Game-Tile. Usually, a Game-Letter is a single letter of the alphabet of the language in use. However, it could also be a combination of two or more letters, such as "Qu", or "ING", or "(E)S", or iconography associated with alternate functionality such as a Wild symbol that can be substituted for any other Game-Letter, or a Blank tile that cannot be used in the formation of any words, or a Bonus tile, the occurrence of a certain number of which in a game outcome triggers a Bonus Event.

Game-Grid: the arrangement of Game-Tiles in a game outcome. Though often depicted as a square or rectangular arrangement of Game-Tiles, other configurations are possible. For example, an arrangement where the number of Game-Tiles per row is not uniform, or an arrangement where the number of Game-Tiles per column is not uniform, or an arrangement with one or more gaps in one or more rows or columns, etc. Other examples would include a hexagonal arrangement of Game-Tiles such as how symbols appear in the Konami Konxion series of slot machines or any other geometric arrangement.

The primary objective of the game is for the player to get game outcomes whereby one or more strings of Game-Letters are present within a specific order and along defined positions of the Game-Grid. In some embodiments, a defined position forms a straight or bent line of Game-Tiles. In some embodiments, the defined position is a contiguous arrangement of Game-Tiles where each Game-Tile within the arrangement is used only once. In some embodiments, the defined position is a contiguous arrangement of Game-Tiles where each Game-Tile within the arrangement is used one or more times.

Valid-Position: describes the positioning of Game-Tiles to be able to form a winning outcome. In some embodiments, a Valid-Position must include one specific Game-Tile location, such as a location in the left-most row (similar to many slot game Payline Payouts). In some embodiments, any appropriately sized sub-set of a defined arrangement, such as any three Game-Tiles along a line extending across four or more Game-Tiles.

Valid-Order: describes the required ordering of Game-Tile within or along a Valid-Position to be able to form a winning outcome.

Game-Phrase: an arrangement of Game-Tiles which matches an arrangement defined as a winning arrangement and conforms to positional requirements. Typically, such an arrangement corresponds to a word within the relevant language of the game. In some embodiments, such an arrangement corresponds to two or more words, e.g. “GOODLUCK” or “WELLDONE”

Phrase-Dictionary: the collection of valid Game-Phrases possible in the game. In some embodiments, this corresponds to some or all of a language dictionary. In some embodiments, this includes proper nouns such as common first names, country names, famous last names, etc. In some embodiments, a plurality of Phrase-Dictionaries may be used. For example, one Phrase-Dictionary for general language words, and a second Phrase-Dictionary composed of Game-Phrases which belong to a particular category, For example, such as Egyptian-related Game-Phrases for an Egyptian-themed game, or such as pirate-related Game-Phrases for a pirate-themed game. Or for example, Game-Phrases for different categories of famous names such as scientists, celebrities, fictional characters, historical figures, etc.

Phrase-List: list of valid Game-Phrases for any given game outcome. In many embodiments, this list is displayed to the player.

Length-Ambiguous-Phrase: an arrangement of Game-Tiles that form two or more possible Game-Phrases relative to how many Game-Tiles are evaluated. For example, the letter pattern “FLOUT” could correspond to the phrases “FLOUT”, “LOUT”, “OUT”, (and relative to the Phrase-Dictionary, possibly also “FLO”). In many embodiments, only the longest phrase is identified in the Phrase-List.

Direction-Ambiguous-Phrase: an arrangement of Game-Tiles that form at least two possible Game-Phrases relative to the direction of evaluation. For example, for the letter pattern “TAR”, a left-to-right evaluation would correspond to the word “tar”, while a right-to-left evaluation would correspond to the word “rat”. A Direction-Ambiguous-Phrase could also be a Length-Ambiguous-Phrase, for example, “START” corresponding to “START”, “TART”, “TAR”, and “ART” when read left-to-right, and “RATS” and “RAT” read right-to-left. A palindrome, such as “POP”, may or may not also be considered to be a Direction-Ambiguous-Phrase relative to the specific game design rules in place.

Inadvertent-Phrase: an arrangement of Game-Tiles which corresponds to an entry in the Phrase-Dictionary but does not conform to positional requirements. For example, in an embodiment without right-to-left evaluation, the letters “RAC” do not correspond to words found in standard English dictionaries, but when backward (right-to-left), read as “car”.

Inadvertent-Word: arrangement of Game-Tiles which exactly or approximately correspond to one or more words within the relevant language of the game but are not in the Phrase-Dictionary. For example, though “KRAP” is typically not found in standard English dictionaries, it is a homophone of the English word “crap”.

Inadvertent-Text: Inadvertent-Phrase and/or Inadvertent-Word

Exclusion-Dictionary: a collection of letter patterns not to appear in any game outcomes as Inadvertent-Text, especially correct and approximate spellings of offensive or upsetting words or phrases.

Bent-Line Position: when the Valid-Position can be depicted as a line with one or more bends, like a Payline in a video slot game.

Bent-Line Ordering: rules governing the particular ordering of Game-Tiles along a Bet-Line Position, for example, a requirement that the Game-Tiles form a Game-Phrase when read from left to right.

Straight-Line Position: when the Valid-Position can be depicted as a straight line (without bends), typically consisting of contiguous Game-Tiles.

Straight-Line Ordering: rules governing the particular ordering of Game-Tiles along a Straight-Line Position, for example, a requirement that the Game-Tiles form a Game-Phrase when read along a particular Valid-Direction.

Valid-Directions: direction along Bent-Line or Straight-Line which Game-Tiles may be evaluated as a winning outcome.

Basic-Directions: Valid-Direction which include left-to-right along a horizontal Straight-Line; top-to-bottom along a vertical Straight-Line, and top-left-to-bottom-right along a downward “\” diagonal Straight-Line.

Extended-Directions: Basic-Directions plus bottom-left-to-top-right along an upward “/” diagonal.

Backward-Directions: reverse direction versions of the Extended-Directions which includes right-to-left along a horizontal Straight-Line; bottom-to-top along a vertical Straight-Line, bottom-right-to-top-left along a downward “\” diagonal Straight-Line, and top-right-to-bottom-left along an upward “/” diagonal.

Filter/Filtering: the process of excluding certain potential game outcomes with unwanted components, such as outcomes that may lead to player confusion such as Direction-Ambiguous-Phrases, and Inadvertent-Text, and such as letter patterns that players might consider disturbing or offensive which match an entry in an Exclusion-Dictionary.

Pre-Defined Filtering: filtering that occurs as part of the process to generate Pre-Defined Outcomes.

Just-In-Time Filtering: filtering that occurs as part of the process to generate a Just-In-Time Outcome.

Results-Driven Generation: game outcome generation technique whereby an outcome is created to fulfill certain outcome result requirements such as number of Game-Phrases, number of Sub-Symbol Multipliers, overall payouts, etc.

In some embodiments, the player is automatically paid for each winning Game-Phrase within a game outcome. In other embodiments, the player must demark a Game-Phrase within a game outcome in order to earn the corresponding Payout. In some embodiments, only one of these play modes is available. In some embodiments, one type of play mode is available in the main game, while a different play mode is available in a Bonus Event. In some embodiments, the player is able to select the play mode.

Auto-Play: mode of play in some embodiments wherein the player is automatically paid for every Game-Phrase. If Phrase-Lists are displayed in such games, typically each Game-Phrase is added to the Phrase-List display as the Game-Phrase is being identified within the Game-Grid.

Match-Play: mode of play in some embodiments wherein the player must demark a Game-Phrase within the Game-Grid in order to receive an award payment. Typically, all of the eligible Game-Phrases are listed in the displayed Phrase-List at the start of a Match-Play round of play.

Game-Phrase-Ordering: for Auto-Play with an outcome consisting of two or more Game-Phrases, this refers to the order in which the Game-Phrases are demarked by the game system. For Match-Play with an outcome consisting of two or more Game-Phrases, this refers to the order in which the Game-Phrases are listed in the Game-Phrase-List such as from top-to-bottom for a vertical Game-Phrase-List display, or such as left-to-right (and possibly then top-to-bottom) for a horizontal Game-Phrase-List.

Game-Clock: in many embodiments, during Match-Play a player has a limited amount of time in which to identify the Game-Phrases available within the Game-Grid. There are a number of ways that the time available per round can be established, as detailed later in this disclosure.

Time-Out: in embodiments where the period available for Match-Play is limited by a Game-Clock, Time-Out refers to the condition of the Game-Clock decrementing to zero with at least one Game-Phrase not demarked by the player.

Seconds-Remaining: in embodiments where the period available for Match-Play is limited by a Game-Clock, Seconds-Remaining refers to the number of seconds remaining on the Game-Clock if the player has demarked all of the available Game-Phrases before the Game-Clock has decremented to zero.

Pre-Identified Game-Phrase: A Game-Phrase in the Game-Grid prior to being identified in the Game-Grid (by either the gaming system or by the player).

Demarked Game-Phrase: A Game-Phrase identified in the Game-Grid (and thus awarded to the player as a Payout).

Missed Game-Phrase: In Match-Play embodiments, refers to a Pre-Identified Game-Phrase not demarked by the player before Time-Out. In some embodiments, the gaming system highlights Missed Game-Phrases in a manner different from how Demarked Game-Phrases are displayed.

Min-Pay Tiles: minimum number of Game-Tiles that can form a Demarked Game-Phrase Payout.

Min-Start Tiles: minimum number of Game-Tiles that must be found within at least one Pre-Identified Game-Phrase in order to play that round. In some embodiments, this value is the same as Min-Pay Tiles. In some embodiments, this value is larger than the Min-Pay Tiles. In such embodiments, one needs at least one “long” word to play, where “long” is a specific number of Game-Tiles that is greater than Min-Pay Tiles.

Phrase-Score: a Basis-Bet Payout for a given demarked Game-Phrase.

Phrase-Multiplier: an additional multiplier applied to a particular Phrase-Score, relative to a Multiplier-Sub-Symbol.

Phrase-Payout: the Phrase-Score relative to any Phrase-Multiplier. If there are no Phrase-Multipliers, then Phrase-Payout=Phrase-Score. If there is one Phrase-Multiplier, then Phrase-Payout=Phrase-Score times Phrase-Multiplier. If there are two or more Phrase-Multipliers, then the Phrase Payout is based on the specific embodiment which can include: Phrase-Payout=Phrase-Score times sum of all Phrase-Multipliers; or Phrase-Payout=Phrase-Score times product of all Phrase-Multipliers; or Phrase-Payout=Phrase-Score times the maximum of all Phrase-Multipliers; or Some other calculation.

Total-Phrase Payouts: sum of all Phrase Payouts

Global-Award Multiplier: additional multiplier, if any, applied to Total-Phrase Payouts. In some embodiments, the Global-Award Multiplier is also applied to Bonus Event Payouts. In some embodiments, the Global-Award Multiplier value is based on the number of Demarked Game-Phrases.

Bonus Event Payout: the sum of all Payouts from a Bonus Event. In some embodiments, Phrase-Multipliers found in the same Demarked-Game-Phrase which triggered the Bonus Event are applied to the Bonus Event Payout. In some embodiments, Phrase-Multipliers do not affect Bonus Event Payouts. In some embodiments, the Bonus Event involves free rounds of play of this invention and the Bonus Event Payout consists of the total of the Payouts from each free round. In some embodiments, each free round of play in the Bonus Event has the same theoretical RTP as a main game play. In some embodiments, each free round of play in the Bonus Event has a higher theoretical RTP as a main game play. In some embodiments, the main game is a type of game other than this invention, such as a slot game or a video poker game, etc.

For ease of description, Table 1 below provides a reference for features defined herein and example variations used in some embodiments of the invention.

TABLE 1

| Feature | Example Variations |
|---|---|
| Tile-Grid shapes | j by k rectangle; hexagonal grid; non-orthogonal grid; etc. |
| Game-Tile Primary-Indicia | letter; wild symbol; blank; bonus triggering symbols; etc. |
| Game-Tile Secondary-Indicia | none; fixed-value Phrase Multiplier, variable valued Phrase Multiplier (only revealed at the time of potential redemption vs. actual redemption); vs. Bonus-Event trigger; etc. |
| Game-Tile Secondary-Indicia assignment | Pre-Defined Assignment; Just-In-Time Assignment; etc. |
| Game-Tile Secondary-Indicia display | at start of a game; at end of a game (all Secondary-Indicia vs. just Game-Tiles included in Demarked Phrases); etc. |
| Phrase-Dictionary | simpler list vs. more comprehensive list; general words vs. thematically selected words; with vs. without certain Proper nouns; etc. |
| Valid-Positions | Straight-Line Positions; Bent-Line Positions; contiguous positions (each Game-Tile used exactly once vs. once or more); etc. |
| Valid-Directions (Straight-Line Ordering) | Basic-Directions vs. Extended-Directions (with vs. without Backward-Directions); etc. |
| Valid-Directions (Bent-Line Ordering) | left-to-right; right-to-left, with vs. without left-most position required; with vs. without right-most position required; etc. |
| Phrase-Score | based on Game-Phrase length; with vs. without Game-Tile specific points (e.g. different Game-Tile letters award differing numbers of score points) |
| Outcome Generation Execution | Pre-Defined Outcomes (filtering occurs as part of the game design/development process); Just-In-Time Outcomes (filtering occurs at the time of generation after a given game is started) |
| Outcome Generation Implementation | Each Game-Element randomly selected from a set of Game-Elements with vs. without replacement; via reel-strips (one Game-Tile high vs. two or more Game-Tiles high); via glyphs; with or without Tumbling Reels/Cascading Symbols follow-up; etc.; Results-Driven Generation whereby a number of Game-Phrases and/or target payout is selected (randomly for Class III, relative to target counts for Class II Pull Tab games), Game-Phrases are randomly selected and placed, remaining Tile-Grid |

TABLE 1-continued

| Feature | Example Variations |
|---|---|
| | positions are filled with Game-Tiles in a fashion not to generate unacceptable Inadvertent Text; etc. |
| Phrase Multiplier application | Applied to Bonus Event payouts vs. not; applied as a sum of values when two or more Phrase Multipliers occurring in the same Demarked Game-Phrase; applied as a product of values when two or more Phrase Multipliers occurring in the same Demarked Game-Phrase; etc. |
| Global Award Multiplier value | none; based on: number of Pre-Identified Game-Phrase, number of Demarked Game-Phrases, number of Pre-Identified Game-Tiles, number of Demarked Game-Tiles, etc.; randomly selected; based on number of sequential wins; based on presence of certain Pre-Identified Game-Tiles; based on presence of certain Demarked Game-Tiles; etc. |
| Global Award Multiplier application | Applies to Total-Phrase Payouts; also does or does not apply to Bonus Event Payouts |
| Play Mode | Auto-Play; Match-Play; player-selected play; Novice Guardrail interruption; with vs without additional payout opportunities for games completed with Match-Play; the same vs. not between main game play and Bonus Event free round play; etc. |
| Bonus Events | related to the present invention (same or different play parameters such as grid shape, grid size, scoring values, multiplier values, Secondary-Indicia values and/or frequency, pay length, trigger length, Game-Element selections, per-round RTP, etc.); unrelated to the present invention; etc. |
| Min-Pay Tiles | 1; 2; 3; 4; etc. |
| Min-Start Tiles | same values vs. greater than the Min-Pay Tiles; etc. |
| Time-Clock initialization | fixed seconds per game; based on the number of Pre-Identified Phrases; based on the number of Pre-Identified Game-Phrases; etc.; all seconds initialized at the start of a game vs. some seconds initialized at the start of the game and other seconds added when a Game-Phrase is demarked; |
| Time-Clock Count down | continuously during Match Play vs. temporarily stalled when a Pre-Identified Game-Phrase is demarked; suspended as part of a Novice Guaranteed mechanism; etc. |
| Game-Phrase-Ordering in Game-Phrase-List (Match Play mode) | list sorted by: longest to shortest Game-Phrases; highest-value to lowest-value Game-Phrases; alphabetic; based on positioning in the Game-Grid (such as can be done for Auto Play); random ordering; etc.; a combination of one or more of the above |
| Game-Phrase-Ordering in Game-Grid (Auto Play mode) | Demarked Game-Phrases demarcation order: based on Game-Phrase-List ordering scheme as described immediately for Match Play mode; first Demarked Game Phrase is closest to a certain grid locations (e.g. top-left corner, left-side of grid, right-side of grid, bottom-right corner); first Demarked Game Phrase which allows for the shortest traveling salesman path between starting Game-Tiles; first Demarked Game Phrase which allows for the shortest traveling salesman path between ending Game-Tiles of one Game-Phrase and the starting Game-Tile of the next Game-Phrase; first Demarked Game-Phrase selected based on other overall sorting scheme; subsequent Demarked Game Phrase is closest to the starting Game-Tile of the previously Demarked Game Phrase; subsequent Demarked Game Phrase is closest to the ending Game-Tile of the previously Demarked Game Phrase; Demarked Game-Phrase demarcation based on Phrase-Score (ascending vs. descending); Demarked Game-Phrase demarcation based on Phrase-Payouts (ascending vs. descending); Demarked Game-Phrase demarcation based on Phrase length (ascending vs. descending); Demarked Game-Phrase demarcation based on the number of Sub-Symbol engagements (ascending vs. descending); Demarked Game-Phrase demarcation based on the value of Sub-Symbol engagements (ascending vs. descending); etc.; combination of one or more of the above |
| Novice Guardrail mechanisms | none; unredeemed winnings added to a Progressive Jackpot or special prize pot such as could be won in a future game with a particular main game outcome or Bonus Event outcome.; only a portion of the winnings associated with Missed Game-Phrases; Match Play converts to Auto Play based on defined circumstance (no initial play input for the first j seconds of the game, no input for k seconds during the play sessions, m or more Missed Game Phrases at Time-Out, if there are n or more Pre-Identified Game Phrases with p seconds on the Game-Clock, etc.); if there are any Missed Game Phrases at Time-Out, the player gets to play a secondary game that can pay a portion and/or the entirety of the unredeemed winnings. |
| EGM | stand-alone gaming system; on casino-premises distributed hardware gaming system; networked-based gaming system (such as via a mobile device network; an intranet network within a casino premise; a worldwide-web internet network, etc.); Class III vs. Class II vs. non-cash social gaming; etc. |

FIG. 1 depicts a display 102 of a system and method of the invention generally referred to by the reference numeral 100. Display 102 illustrates, among other things, an example embodiment 1 featuring a 5×6 rectangular arrangement or playfield 104 of Game-Tiles. Each of the 30 Game-Tile displays at least 1 letter. As shown on display 102, one Game-Tile displays a two-letter combination "Qu". One Game-Tile, with the letter "I" in the top row, displays a "3×" Phrase-Multiplier Sub-Symbol in its lower-right corner. Another Game-Tile with the letter "N" in the bottom row displays a "25×" Phrase-Multiplier Sub-Symbol in its lower-right corner. Just below the Tile-Grid is a line of multiplier values "×1", "×2", "×4", and "×8". These represent Global Award Multipliers applied to outcomes with 1, 2, 3, and 4 or more Demarked Game-Phrases. Visible in the left-hand column of display 102 is a display field 106 containing information such as the rule indicating that only letter patterns with 4 or more letters can be valid Game-Phrases that will payout awards. Also visible in display field 106 of display 102 is the notification that "extra-rich free games" will be awarded for outcomes with two or more bonus symbols. Though not explicitly mentioned or displayed, only the Valid-Directions are Base-Directions.

Also in display field 106 of the playfield 104, just above the game rules based on the configuration shown in FIG. 1, is a message describing the state of the game, specifically "No Win. Try again." This message indicates that the previous game outcome, which is what is displayed on the Tile-Grid in playfield 104, has no winning outcomes, and that this previous game is over and a new game can be started. On display 102 at the right-hand side of the playfield 104, based on the orientation of display 102 shown in FIG. 1, there is a display field 108 including a Game-Phrase-List with the heading "Words" but which is otherwise blank. This is consistent with an outcome with no available Game-Phrases, such as the outcome shown in playfield 104 of display 102. A game status bar 110 showing credits, bet and win status is positioned at the bottom of display area 102 based on the orientation shown in FIG. 1. In this embodiment, bar 110 also includes a button labelled "start" and buttons for increasing or decreasing the total bet.

Figure 2:
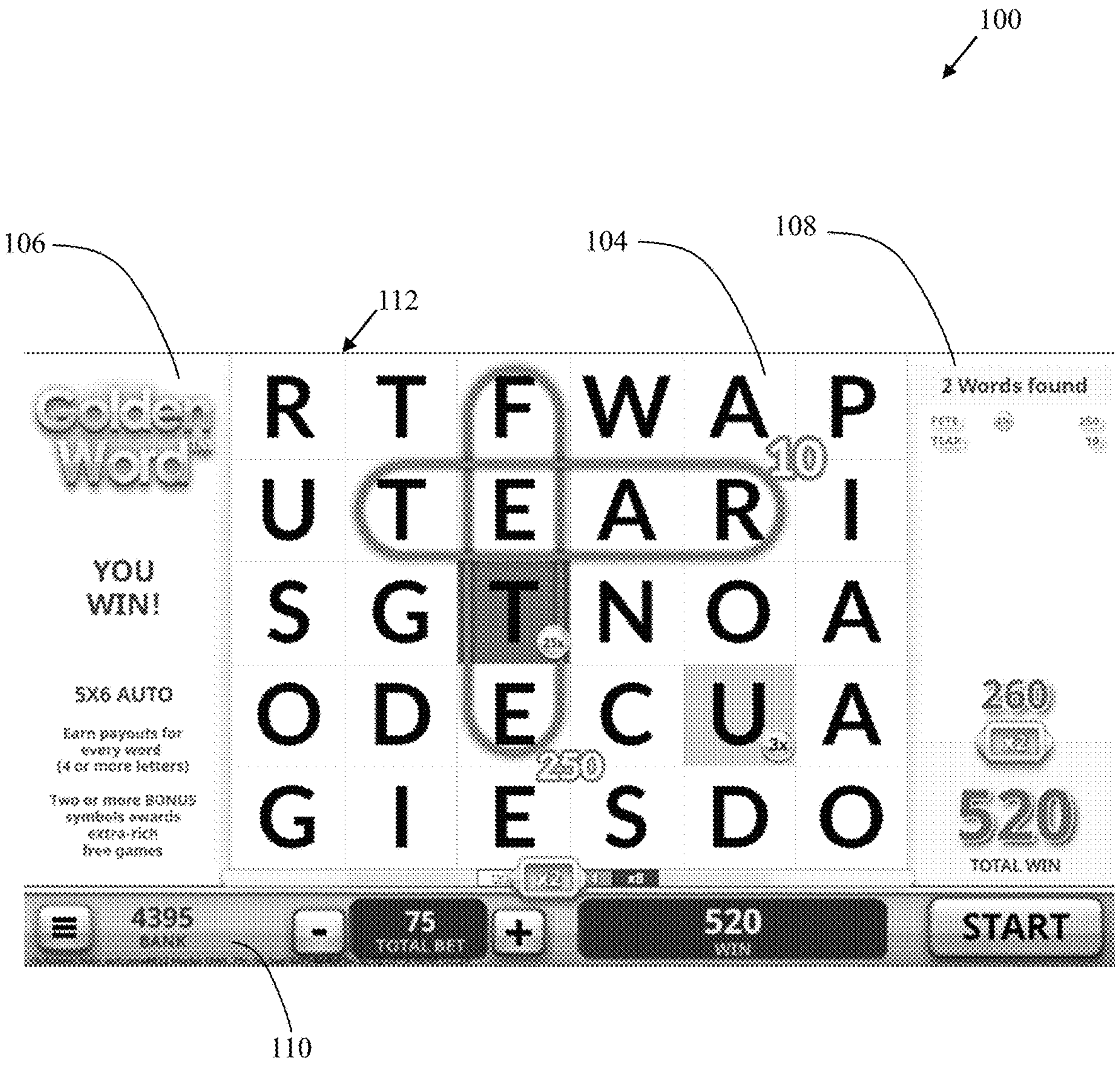

FIG. 2 depicts a display 112 illustrating the end state of a first winning outcome of Embodiment 1. On the Grid-Tile in playfield 104, the two available Game-Phrases are demarked: "FETE" and "TEAR". In this embodiment, a Demarked Game-Phrases consisting of 4 Game-Tiles pays 10, which is referred to as a Phrase-Score. Because "TEAR" has no Phrase-Multiplier Sub-Symbols, its Phrase-Payout is the same as its Phrase-Score. On the other hand, "FETE" includes a Game-Tile with a 25× Phrase-Multiplier Sub-Symbol. Because of this Phrase-Multiplier, the Phrase-Payout for this Demarked Game-Phrase is 25 times larger than its Phrase-Score: Phrase-Payout=Phrase-Score times Phrase-Multiplier=10×25=250. The Total Phrase-Payouts is the sum of the Phrase-Payouts of the two Demarked Game-Phrases: 10+250=260.

For Example, in Embodiment 1 discussed herein, a game outcome with two Demarked Game-Phrases is awarded a Global Award Multiplier of ×2. Just below the Tile-Grid in playfield 104 the value "×2" is highlighted with a gold border. The Overall-Payout is equal to the Total Phrase-Payouts times the Global Award Multiplier: 260×"×2"=520. Display field 106 communicates through a displayed notification that the outcome is a win and display field 108 shows indicates through a displayed notification that 2 words have been found as well as the payout award of 520, which is also displayed in bar 110 as the credits won.

Figure 3:
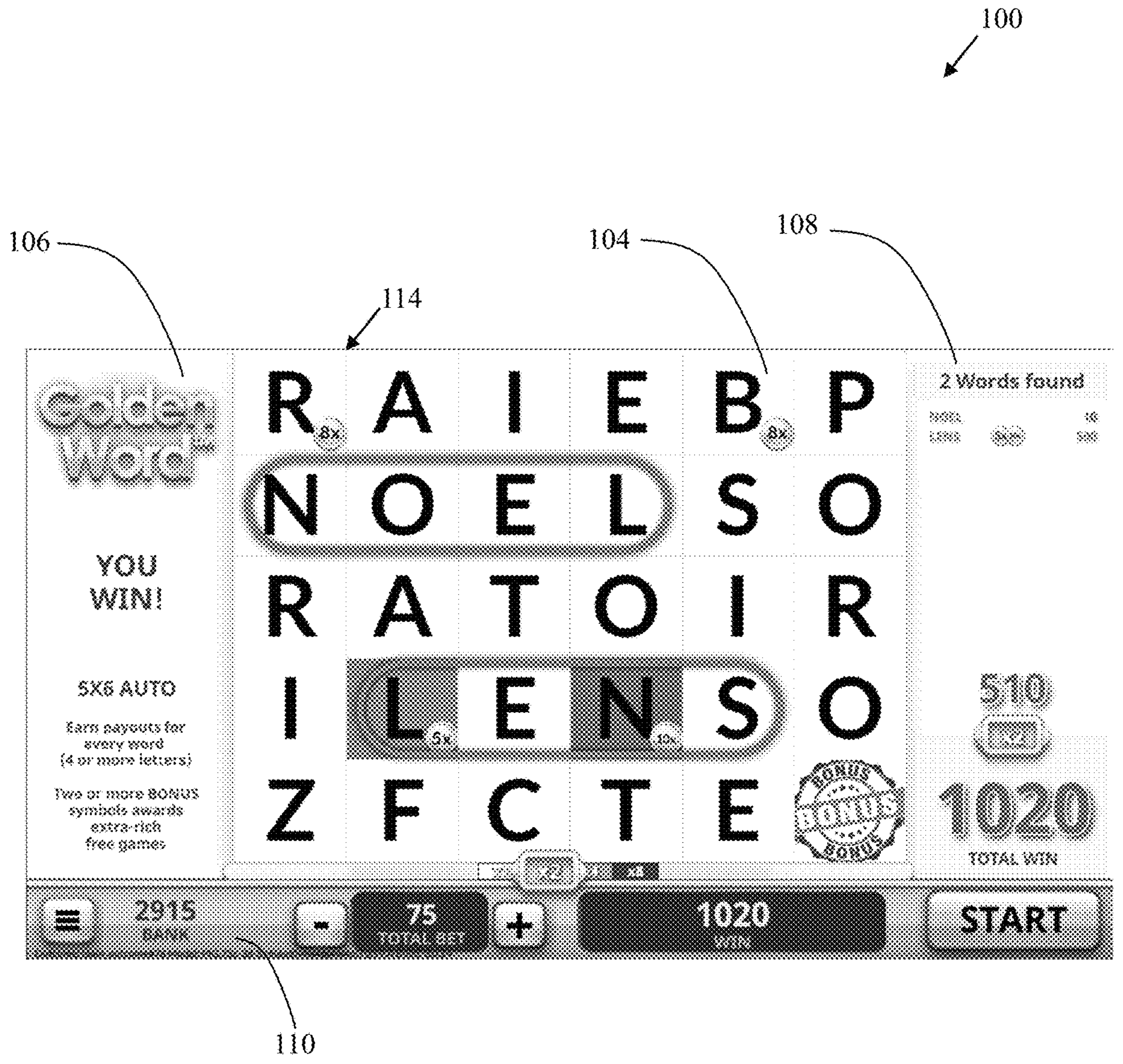

FIG. 3 provides a display 114 depicting the end state of a second winning outcome of Embodiment 1. In this outcome, one of the Demarked Game-Phrases, "LENS", is comprised of two Game-Tiles with a Phrase-Multiplier Sub-Symbol: The Game-Tile with an "L" has a "5×" multiplier and the Game-Tile with an "N" has a "10×" multiplier. In this example embodiment, the Phrase-Payout=the Phrase-Score (10) times the product of Phrase-Multipliers (5×10): 10×(5×10)=500. In alternate embodiments not shown, the Phrase-Payout the Phrase-Score (10) times the sum of Phrase-Multipliers (5+10): 10×(5+10)=150.

Figure 4:
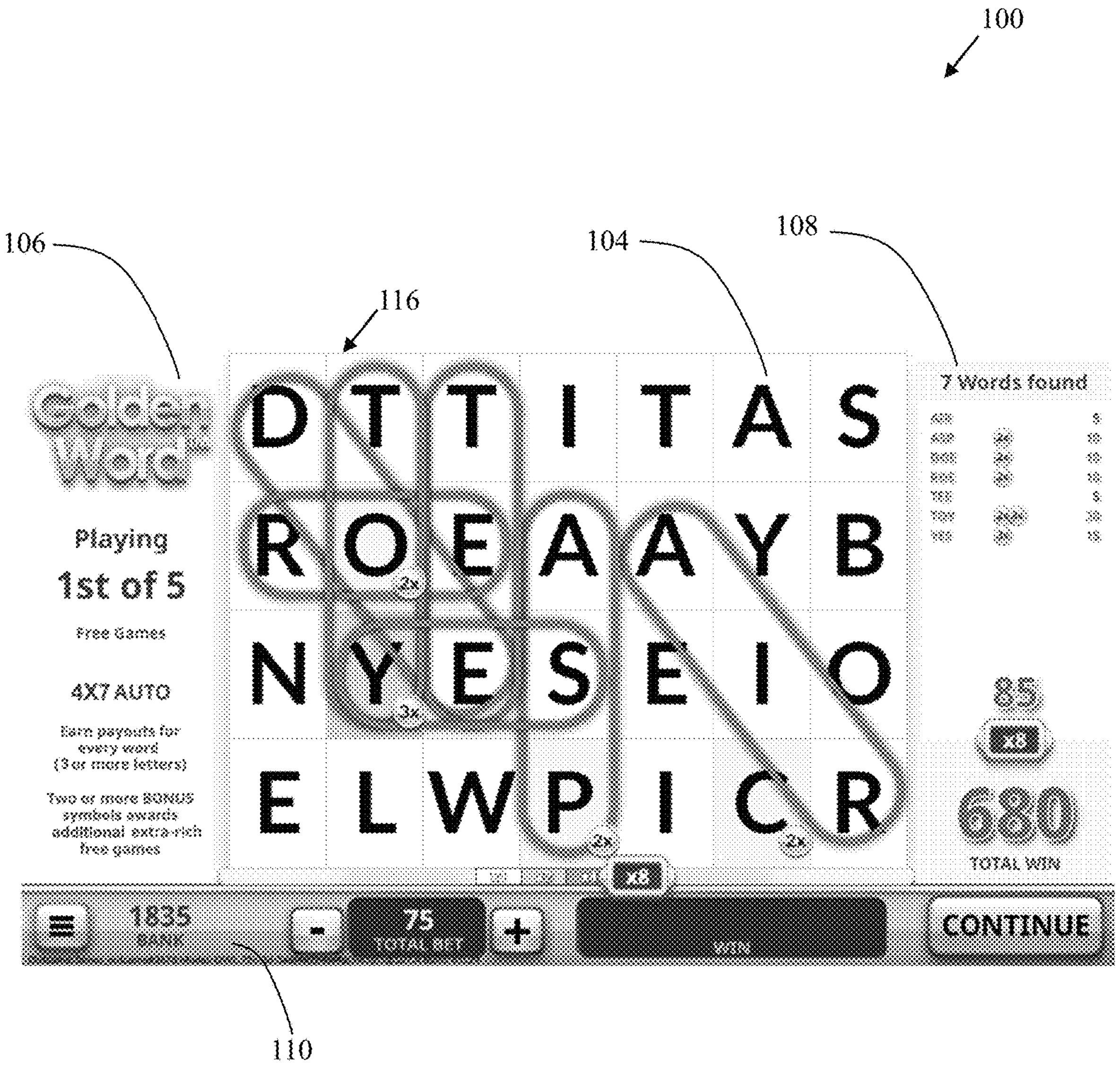

In the lower right corner of the Tile-Grid in playfield 104 of display 114 shown in FIG. 3, the Game-Tile displays a "BONUS" symbol. If two or more such symbols appear in an outcome of Example Embodiment 1, a Bonus Event is awarded, such as 5 extra-rich free rounds of play. For example, FIG. 4 shows display 116 which illustrates an example free round of play. Unlike the main game from which this Bonus Event was triggered (5x6 Game-Tiles, Game-Phrases have at least 4 Game-Tiles), the Bonus Event free round is played on a 4×7 grid of Game-Tiles in playfield 104, where valid Game-Phrases only need a minimum of 3 Game-Tiles which results in more available payouts. For example, the outcome shown in FIG. 4 would be a losing outcome with no payouts if Game-Phrases required a minimum of 4 Game-Tiles.

The Game-Phrases in the Phrase-List shown display field 108 of in FIG. 4 are listed in alphabetic order and this was the order in which the Game-Phrases were demarked on the Tile-Grid. Specifically, at the very start of this bonus round, the player sees the Tile-Grid without any demarcation. Then the system shows the first Game-Phrase "AIR" get encircles with a green border, one Game-Tile at a time, starting with the first letter "A", and extending to encompass each subsequent letter. After the first Game-Phrase is fully demarked, the second Game-Phrase "ASP" then undergoes its demarcation animation starting at the first Game-Tile "A", and then each subsequent Game-Tile until the entire word has been encircled While a Game-Phrase Ordering provides the minor benefit of creating an alphabetically sorted Game-Phrase-List, it can lead to situations in which players may have a difficult time following along with the Game Phrase Demarcation, especially if the next Game-Phrase to be demarked is relatively distant from the end of the last Game-Phrase to be demarked. Players can generally follow along with the demarcation animations by minimizing the distances between the subsequent Game-Phrase.

Figure 5:
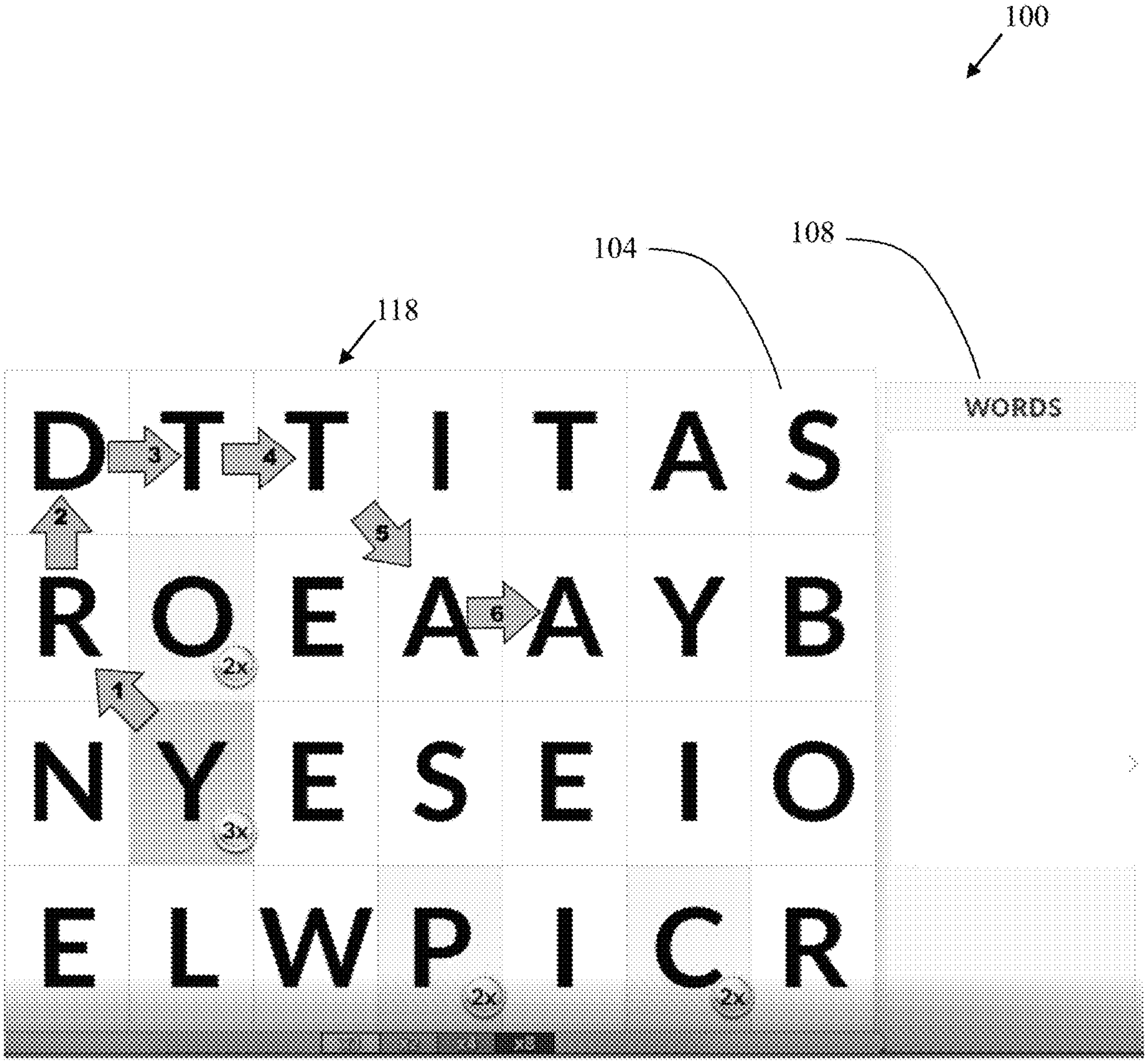

In alternate embodiments not shown, different Game-Phrase Orderings can be employed. For example, a top-to-bottom then left-to-right Game-Phrase Ordering would demark the 7 Game Phrases in this order: "DOE", "TOY", "TEE", "ROE", "ASP", "AIR", "YES". For another example, a left-to-right then top-to-bottom Game-Phrase Ordering would demark the 7 Game Phrases in this order: "DOE", "ROE", "TOY", "YES", "TEE", "ASP", "AIR" or as "DOT", "ROE", "TOY", "TEA", "YES", "ASP", "AIR" relative to the actual sorting scheme. For another example, a Game-Phrase Ordering may minimize the distances between the starting positions of the Game-Phrases. Though "YES" does not start at a corner or edge of the Tile-Grid, by choosing this as the first Game-Phrase to be demarked, the distances between starting Game-Tiles between each subsequent Game-Phrase demarking can be limited to always be no further than adjacent Game-Tiles when the overall ordering is "YES", "ROE", "DOE", "TOY", "TEE", "ASP", "AIR". This ordering is illustrated in display 118 in FIG. 5 with numbered arrows added to an image of the Tile-Grid in playfield 104 prior to any demarcation.

One of the downsides of Game-Phrase Ordering schemes such as left-to-right then top-to-bottom, or top-to-bottom then left-to-right, is that it can cause players to prematurely know that their present outcome has limited winning potential. One of the advantages of the present invention is that in the Auto-Play mode, players typically cannot tell at a glance how many Pre-Identified Game Phrases there are prior to demarcation. While a given Game Phrase is undergoing its demarcation animation, the player can have hope and anticipation that this will be followed by additional, and perhaps even more valuable demarcations. However, with a Game-Phrase Ordering that, for example, would always demark a Game-Phrase on the lowest row whose final Game-Tile corresponds to the bottom-right corner of the Tile-Grid, a player observing such demarcation in progress would then know that this is the last (or only) winning Game-Phrase for that round of play. This would reduce overall excitement and anticipation for the player.

One way to reduce prematurely signaling to a player that their last (and potentially only) paying Game-Phrase is being demarked, is to randomly employ two or more Game-Phrase Orderings. For example, for about half of the games, a top-to-bottom then left-to-right ordering is employed, while for the other games, a bottom-to-top then right-to-left ordering is employed. Using the prior example of a Game-Phrase in the bottom right corner being marked, if this is the first Game-Phrase within a given round of play to under demarcation, there is approximately 50:50 chance that this corresponds to the starting portion of the Tile-Grid thus allowing for the possibility of an additional Pre-Identified Game-Phrase.

Figure 6:
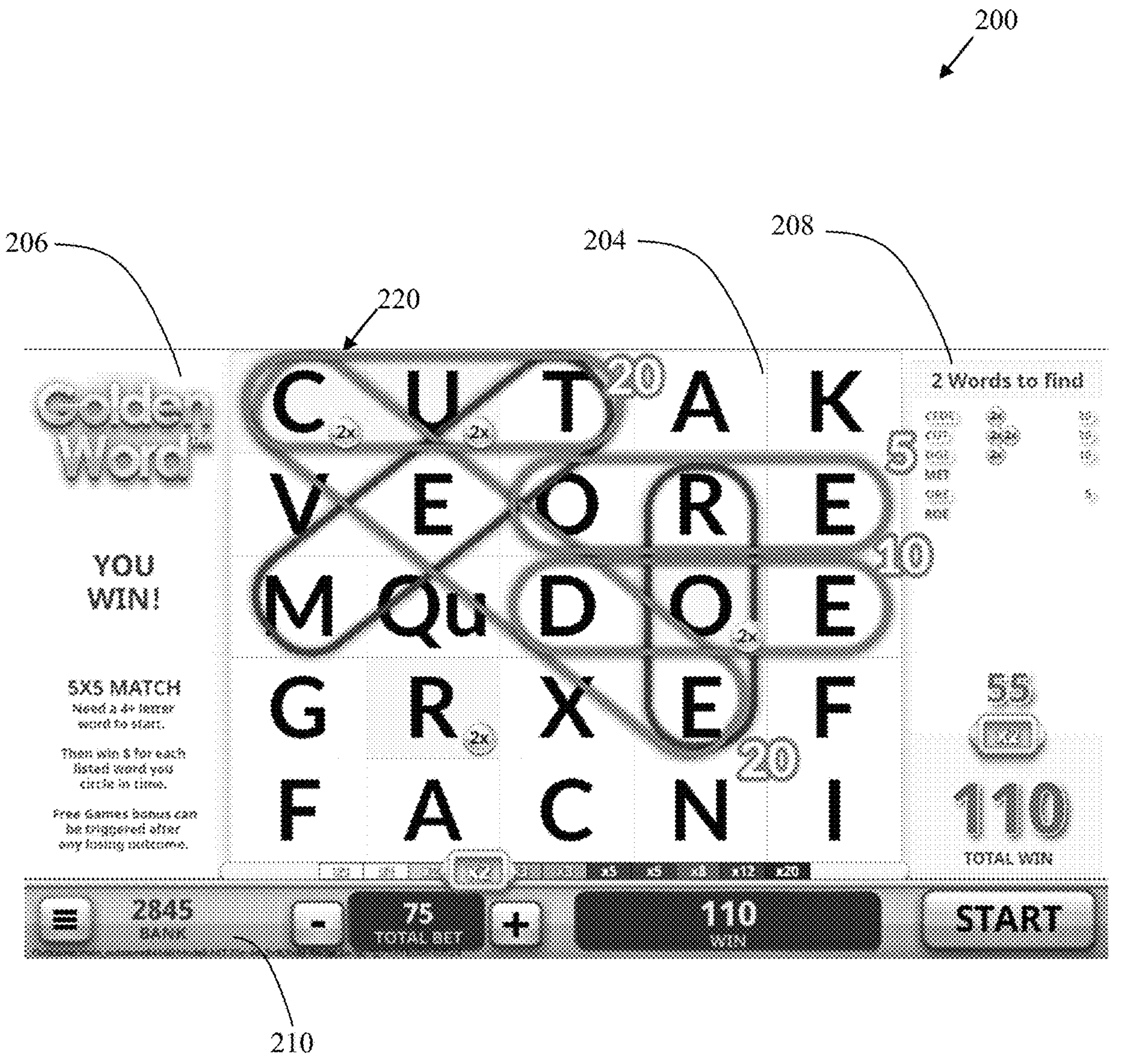

FIG. 6 illustrates a system and method generally designated by reference numeral 200 which includes a display 220 illustrating a second example of an embodiment of the invention which features Match Play on a 5×5 Tile-Grid in playfield 204, with valid Min-Pay Tiles being 3 or more Game-Tiles for payouts but with a 4 Min-Start Tiles requirement meaning there must be at least one Game-Phrase with 4 or more Game-Tiles for a given outcome to be eligible for play irrespective of how many Game-Phrases of 3 Game-Tiles could be formed otherwise. This example embodiment also features a different sequence of Global Award Multipliers, specifically "×1", "×1", "×2", "×2", "×3", "×3". "×5". "×5", "×8". "×12", "×20" multipliers for outcomes resulting in 1, 2, 3, 4, 5, 6, 7, 8, 9, 10, 11 or more Demarked Game-Phrases. Because 4 Game-Phrases were demarked, the Global-Award Multiplier advanced to the fourth position which is associated with an "×2" value.

The end-of-game result shown in display 220 of FIG. 6 depicts 4 Demarked Game-Phrases encircled in green that the player was able to demark before Time-Out, and two Missed Game-Phrases encircled in a different color. The player only gets paid for the 4 Demarked Game-Phrases as shown by notifications and information in display fields 206, 208 and bar 210.

Figure 7:
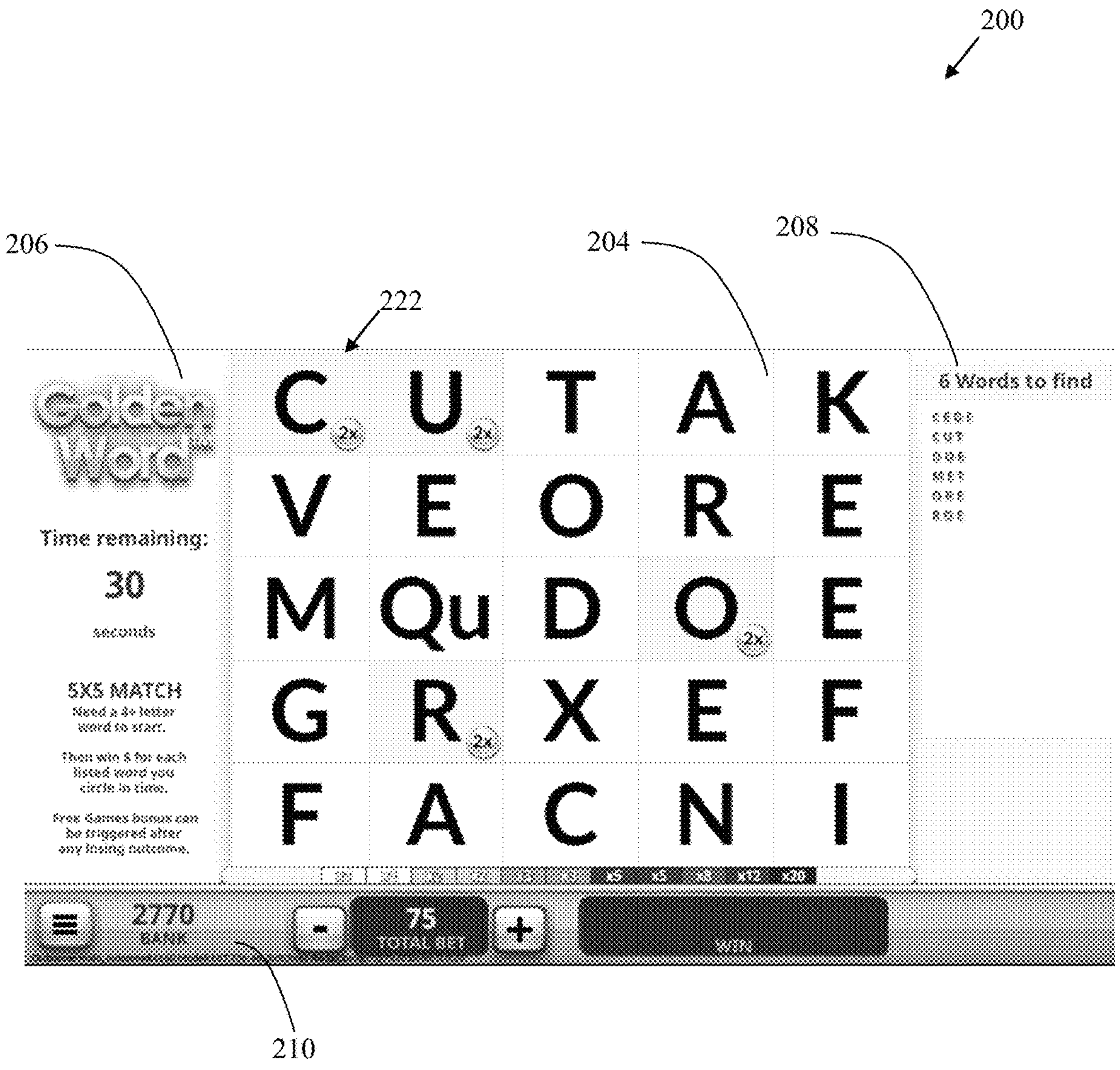

At the start of this example game of system 200, shown in display 222 of FIG. 7 the player was given 30 seconds on the Game-Clock as shown in display field 206 in which to demark all the Pre-Identified Game-Phrases in playfield 204. On the right side of the playfield 204 in field 208 is the Game-Phrase-List indicating there are 6 Pre-Identified Game-Phrases, and the list of these Game-Phrases, the ordering of which lists the longest Game-Phrases first (there is only one, "CEDE", which is the Game-Phrase with at least 4 Game-Tiles that made this outcome eligible to be played) followed by the remaining words in alphabetic order.

Figure 8:
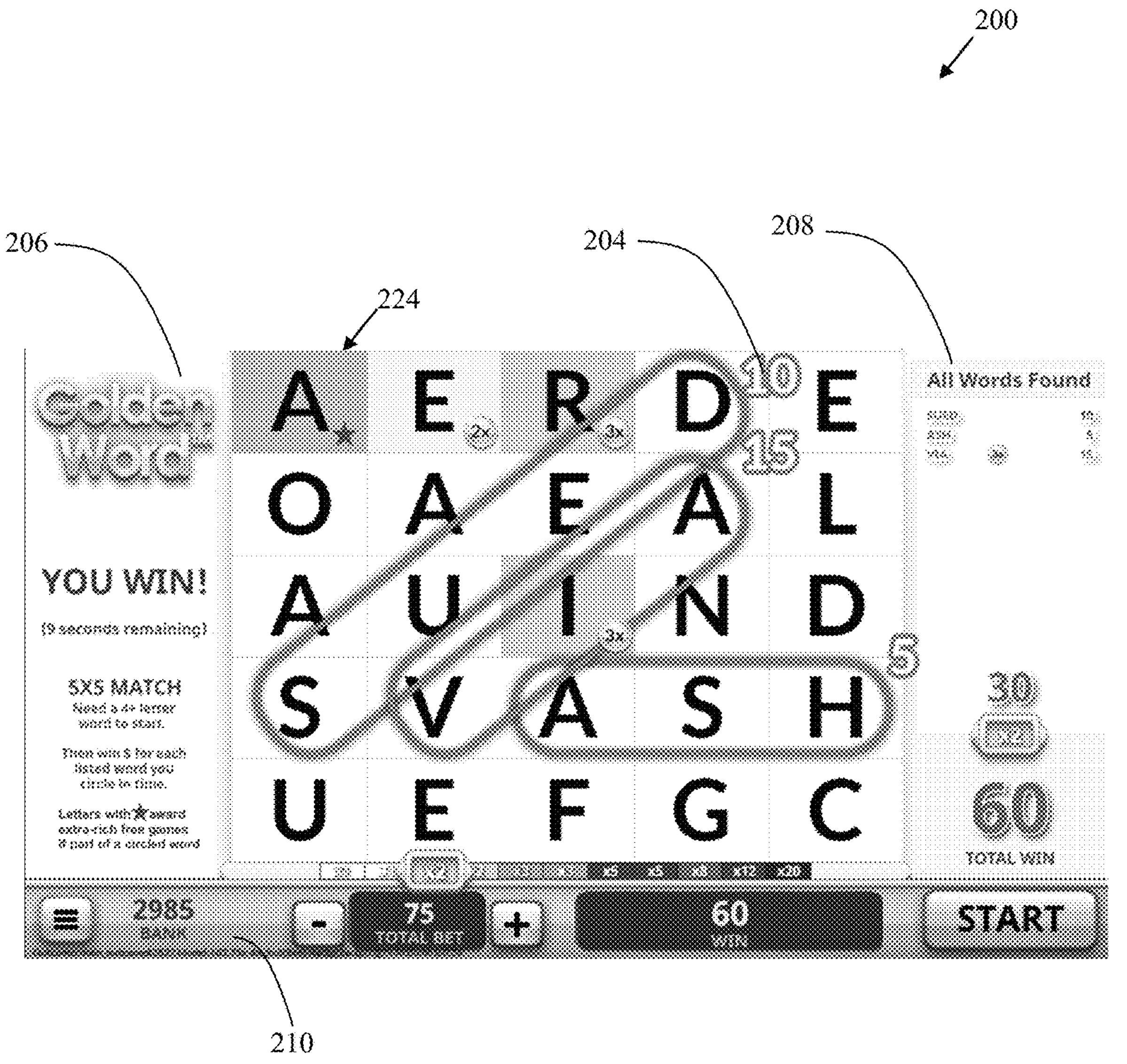
Figure 9:
Figure 10:
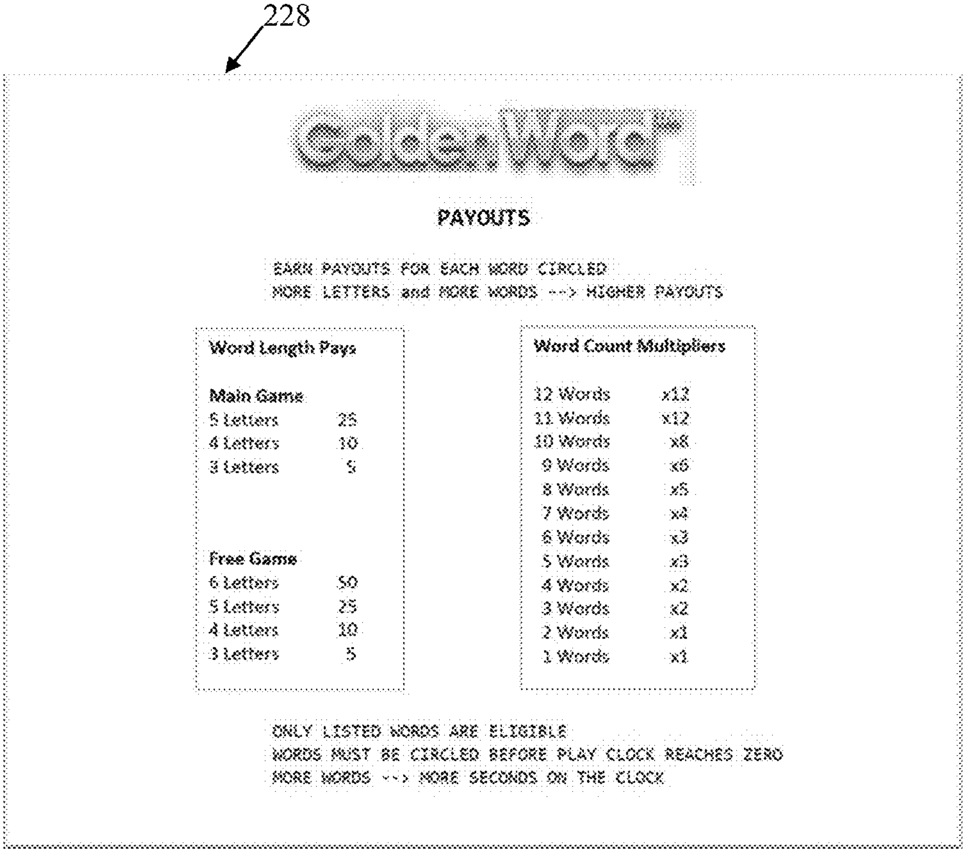
Figure 11:
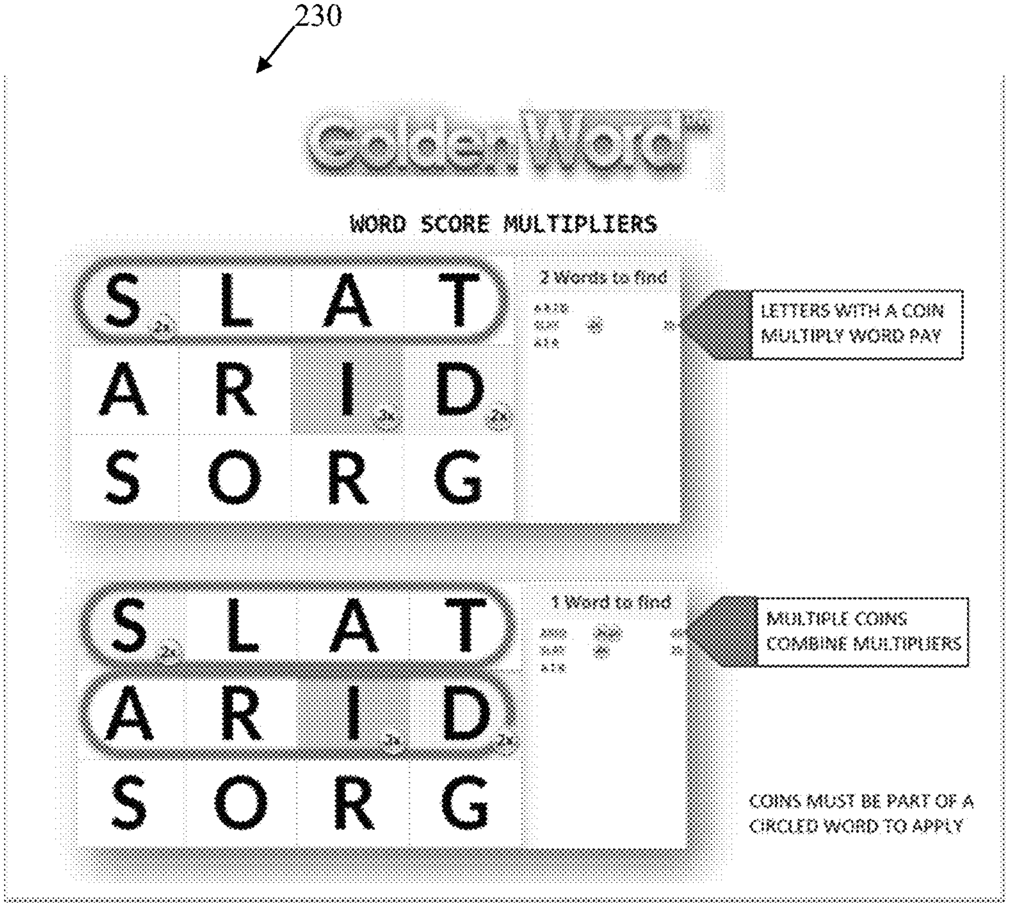
Figure 12:
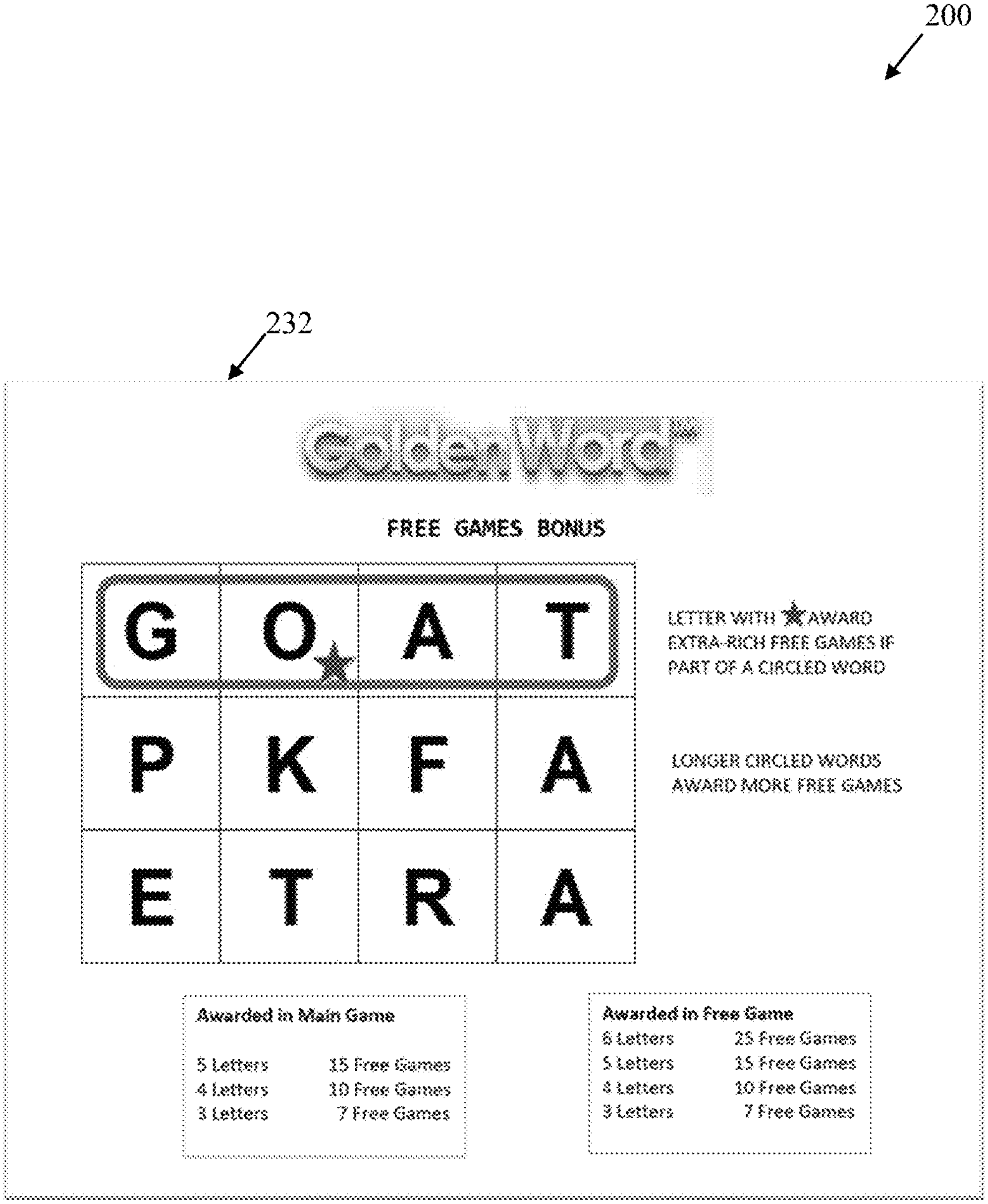

FIG. 8 shows a display 224 which depicts another outcome of Example Embodiment 2 in which all of the Pre-Identified Game Phrases were demarked before the Game-Clock ran out. Just below the "YOU WIN!" game status message in field 206 is the text "(9 seconds remaining)" which indicates that there were 9 seconds on the Game-Clock when the last Pre-Identified Game-Phrase was demarked. In some embodiments, not depicted, these remaining seconds cause a secondary state to update accordingly, said secondary state associated with some secondary feature such a Bonus Event trigger accumulator, or a Progressive Jackpot, or leaderboard status, or increased chance to win a secondary award, etc.

In the top-left corner of the Tile-Grid in playfield 204 in FIG. 8 the Game-Tile depicts an "A" as the Primary-Indicium and a star icon in the bottom-right corner as the Secondary-Indicium. On the bottom of the left side of the screen is an explanation of the star icon. Specifically, if a Demarked Game-Phrase contains a Game-Tile with a star icon, this will award the player a Bonus Event. FIG. 9 thru FIG. 13 provide exemplary displays 226, 228, 230, 232 and 234, which represent a possible Paytable for Example Embodiment 2.

Filtering

In many embodiments, game outcome generation involves at least 3 steps: randomly create a Pre-Filtered Outcome ("Pre-Filtered Outcome"); analyze the Pre-Filtered Outcome for unwanted content; and remove/modify the unwanted content or throw away the Pre-Filtered Outcome and try again.

Figure 14:
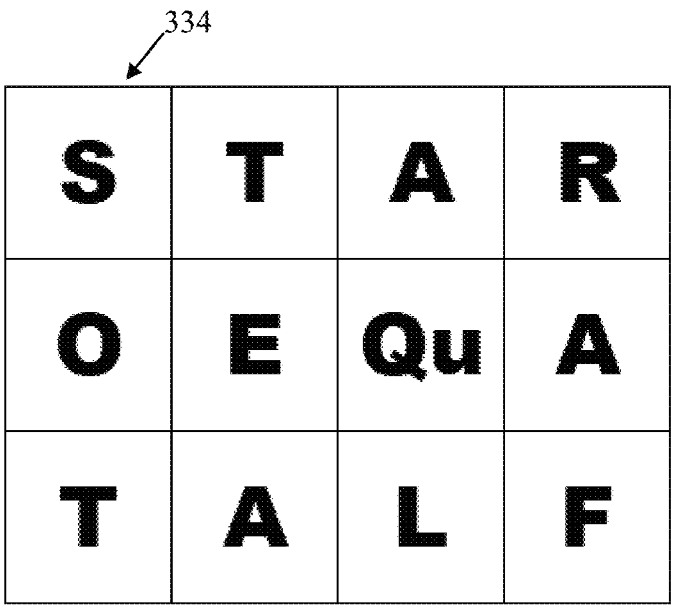
FIG. 14 provides an exemplary display of representative portion of an outcome of a system and method of the invention.

FIG. 14 provides an illustration 334 which represents a portion of an example Pre-Filtered Outcome which contains a number of potentially problematic text patterns. For example, "STAR" is a Directional-Ambiguous Phrase that can be read as "star" left-to-right and "rats" right-to-left. "STAR" is also a Length-Ambiguous Phrase in that it can be read as "star" and "tar". The Game-Phrase "TEA" appears in two different places, The text "SOT" is a derogatory term. The text "RAF" is an acronym for a professional organization (the United Kingdom's Royal Air Force). The text "ALF" is also the name of a commercial enterprise that might object to the unauthorized use of its trademark. The text "QuA" can be formed in three different directions. The word "qua" is found in most English dictionaries, but in a game with 3 Min Pay Tiles, a word based on two Game-Tiles ("Qu", and "A") might cause player confusion. The text "TALF", if read from right-to-left, reads "flat". Even if right-to-left was not a Valid-Direction, it might still lead to player confusion.

In some embodiments not shown, where game outcomes are formed from the random selection of groups of two or more Outcome-Elements from a pre-defined reel strip of Outcome-Elements, there are two general approaches to outcome filtering. In some variations, the filtering takes place during game development by forming and checking all possible combinations of reel strip selections. If an offensive string of letters gets formed, one or more of the Game-Elements with said text gets manually or automatically changed, and then the filtering continues. In some other variations, the filtering takes place when a Game Outcome is formed, such as for a single play of the game or such as during the creation of Pre-Defined Outcomes, etc. In some embodiments, a given Pre-Filtered Outcome that does not conform to all the filtering requirements is simply deleted and a new Pre-Filtered Outcome is generated. In the case where this is during live play of the game by a player, the skipped-over Pre-Filtered Outcome is never displayed to the player.

In some embodiments not shown, that rely upon Pre-Defined Outcomes, additional filtering steps are applied to control payout characteristics. For example, a subset of available Game Outcomes are excluded from the final pool of Game Outcomes in order to control overall RTP. For example, for a given Class II Electronic Pull-Tab implementation, the game developer can generate, say 600,000 available Game Outcomes from which 500,000 will be chosen for public release. Selection criteria can include, (a) having the total RTP of the final pool equal a market-specific value; (b) limiting the number of awards above a certain value; (c) assuring the inclusion of a certain number of awards at or above a particular value; (d) the reduction or exclusion of certain award values such as payout of "13", "113", etc.; (e) the inclusion of a certain number of Bonus Events; (f) conforming to a certain general or specific distribution of payout values; (g) the reduction or exclusion of certain outcomes based on their appearance such as not choosing losing outcomes with more than a certain number of rare letters; and (h) and other appropriate selection criteria.

TABLE 2

| Col. 1 Letter | Col. 2 Selection Weight | Col. 3 Cum Weight | Col. 4 Selection Probability | Col. 5 Cum Probability | Col. 6 Limit | Col. 7 Score |
|---|---|---|---|---|---|---|
| A | 9 | 9 | 9.18367% | 9.18367% | 3 | 1 |
| B | 2 | 11 | 2.04082% | 11.22449% | 2 | 3 |
| C | 2 | 13 | 2.04082% | 13.26531% | 2 | 3 |
| D | 4 | 17 | 4.08163% | 17.34694% | 3 | 2 |
| E | 12 | 29 | 12.24490% | 29.59184% | 3 | 1 |
| F | 2 | 31 | 2.04082% | 31.63265% | 1 | 4 |
| G | 3 | 34 | 3.06122% | 34.69388% | 1 | 2 |
| H | 2 | 36 | 2.04082% | 36.73469% | 2 | 4 |
| I | 9 | 45 | 9.18367% | 45.91837% | 3 | 1 |
| J | 1 | 46 | 1.02041% | 46.93878% | 1 | 8 |
| K | 1 | 47 | 1.02041% | 47.95918% | 1 | 5 |
| L | 4 | 51 | 4.08163% | 52.04082% | 2 | 1 |
| M | 2 | 53 | 2.04082% | 54.08163% | 1 | 3 |
| N | 6 | 59 | 6.12245% | 60.20408% | 1 | 1 |
| O | 8 | 67 | 8.16327% | 68.36735% | 3 | 1 |
| P | 2 | 69 | 2.04082% | 70.40816% | 1 | 3 |
| Q | 1 | 70 | 1.02041% | 71.42857% | 1 | 10 |
| R | 6 | 76 | 6.12245% | 77.55102% | 2 | 1 |
| S | 4 | 80 | 4.08163% | 81.63265% | 2 | 1 |
| T | 6 | 86 | 6.12245% | 87.75510% | 1 | 1 |
| U | 4 | 90 | 4.08163% | 91.83673% | 3 | 1 |
| V | 2 | 92 | 2.04082% | 93.87755% | 1 | 4 |
| W | 2 | 94 | 2.04082% | 95.91837% | 1 | 4 |
| X | 1 | 95 | 1.02041% | 96.93878% | 1 | 8 |
| Y | 2 | 97 | 2.04082% | 98.97959% | 2 | 4 |
| Z | 1 | 98 | 1.02041% | 100.00000% | 1 | 10 |

Outcome Generation

There are a number of possible processes to create final game outcomes. In the case of most, if not all, Class II implementations and some Class III implementations, the outcome generation process occurs as part of game design and development and is thus established prior to the placement of the corresponding software/control data into EGM operation. In such implementations, the order of predefined outcome generation is randomized prior to play. In some embodiments, this is accomplished by a random shuffling of outcomes at design and development time. In most embodiments, the random selection occurs at each play of the game based on, for example, the direct result of an RNG, or on the result of the play of electronic bingo (which, in turn, relies upon an RNG). In other embodiments, notably for Class III implementations, each outcome generation occurs immediately after a player requests a play of the game.

In many embodiments, the first step of outcome generation is the creation of a Pre-Filtered Outcome, in which a Primary-Indicum and possibly a Secondary Indicum are assigned to each Game-Tile position. In some embodiments, the selection of Secondary-Indicia is fully independent of Primary-Indicia assignments. In some embodiments, the selection of Secondary-Indicia is partially dependent upon the Primary-Indicia assignment, such as to prevent Secondary-Indicia from being randomly assigned to lesser selected letters such as "X", "Z", "Q", etc. In some embodiments, the selection of Game-Tile indicia is based upon a pool of pre-assigned Game-Tile values in which certain pairings of a Primary-Indicum and a Secondary Indicum have already been established.

In some embodiments, the Primary-Indicum for each Game-Tile of a Pre-Filtered Outcome is independently or semi-independently assigned. In some embodiments, such assignments are regulated based on control data such as some or all of the data columns in Table 2.

For example, in some embodiments, only Col. 1 data is necessary which allows the assignment of any letter with equal probability. In some embodiments with independent selection, a given letter can be assigned to multiple Game-Tiles. In some variations, it would be theoretically possible for every Game-Tile to be assigned the same letter. In some embodiments with a semi-independent letter, a given letter can only be assigned once per game outcome. Thus when a certain letter is randomly assigned to a Game-Tile within a Pre-Filtered Outcome, no other Game-Tile within said Pre-Filtered Outcome may also be assigned this letter.

Because letters do not appear within the words with equal likeliness, a weighted selection of letters can improve the chances for the formation of Game-Phrases. For example, any of the columns from Col. 2 through Col. 5, in Table 2 would be sufficient to support the selection of letters with non-uniform probabilities. Col. 2 contains the selection weight for each letter. These weights also match the number of tiles in a typical Scrabble game with the same letter. The probability for a given letter's selection is equal to its selection weight relative to the sum of all selection weights. For example, because the selection weight assigned to the letter "D" is 4, the corresponding probability of selection=4 (selection weight for "D") divided by 98 (total selection weights)=4.08163%. The values in Col. 4 form a list of these probabilities. Col. 2 contains the sum of the selection weights representing the sum of weights for the first letter through the selected letter. For example, the row for the letter "C" has a cumulative weight of 13, which corresponds to individual weights defined for letters "A" (9), "B" (2), and "C" (2). The values in Col. 5 form a list of the corresponding cumulative probabilities.

In some embodiments, "Cum Weights" data in Col. C. are used by a process such as depicted in flow-chart 400 shown in FIG. 15.

Other algorithms which use this data column of any of the other data columns should be well-known to competent practitioners.

In some semi-independent selection embodiments, a limit is placed on the number of times a given letter can appear within the same game outcome. For example, a global limit of 1 means that each Game-Tile within any given game outcome has a unique letter. In another example, a global limit of 2 means that a given letter can appear on no more than two Game-Tiles within the same outcome. In another variation, each letter has its own limit as shown in Col. 6, which allows frequently used letters like "A" and "E" to appear multiple times whilst limited the number of rarely used letters like "Z" or "Q".

Though not directly related to Game-Tile selection, a control data table such as shown in Table 2 may contain other control data such as the letter score values in Col. 7 which is used by some embodiments in the determination of Phrase-Scores. In some embodiments, additional control data is used. In some embodiments, a plurality of control data tables are used.

In some embodiments, an "unwound" control data table is used, for example, such as: char gameElements[98]=

{'A', 'A', 'A', 'A', 'A', 'A', 'A', 'A', 'A', 'B', 'B', 'C', 'C', 'D', 'D', 'D', 'D', 'E', 'E', 'E', 'E', 'E', 'E', 'E', 'E', 'E', 'E', 'E', 'E', 'F', 'F', 'G', 'G', 'G', 'H', 'H', 'I', 'I', 'I', 'I', 'I', 'I', 'I', 'I', 'I', 'J', 'K', 'L', 'L', 'L', 'L', 'M', 'M', 'N', 'N', 'N', 'N', 'N', 'N', 'O', 'O', 'O', 'O', 'O', 'O', 'O', 'O', 'P', 'P', 'Q', 'R', 'R', 'R', 'R', 'R', 'R', 'S', 'S', 'S', 'S', 'T', 'T', 'T', 'T', 'T', 'T', 'U', 'U', 'U', 'U', 'V', 'V', 'W', 'W', 'X', 'Y', 'Y', 'Z'};

which allows for the fast, direct selection of letters based on a random integer array index between 1 and 98 (or 1 and 97 depending upon the programming language). An array such as this can also be used for embodiments using without-replacement selection. For example, in some variations, each time a letter is selected, that position in the array is overwritten with a special character. If a subsequent selection within the same outcome generation results in a special character, the selection is simply repeated until a proper letter results. In some variations, the last letter in the array replaces the letter just selected, and the effective length of the array decreases by 1. In such variations, the array is restored to its original values at the start of each new game outcome generation.

Figure 15:
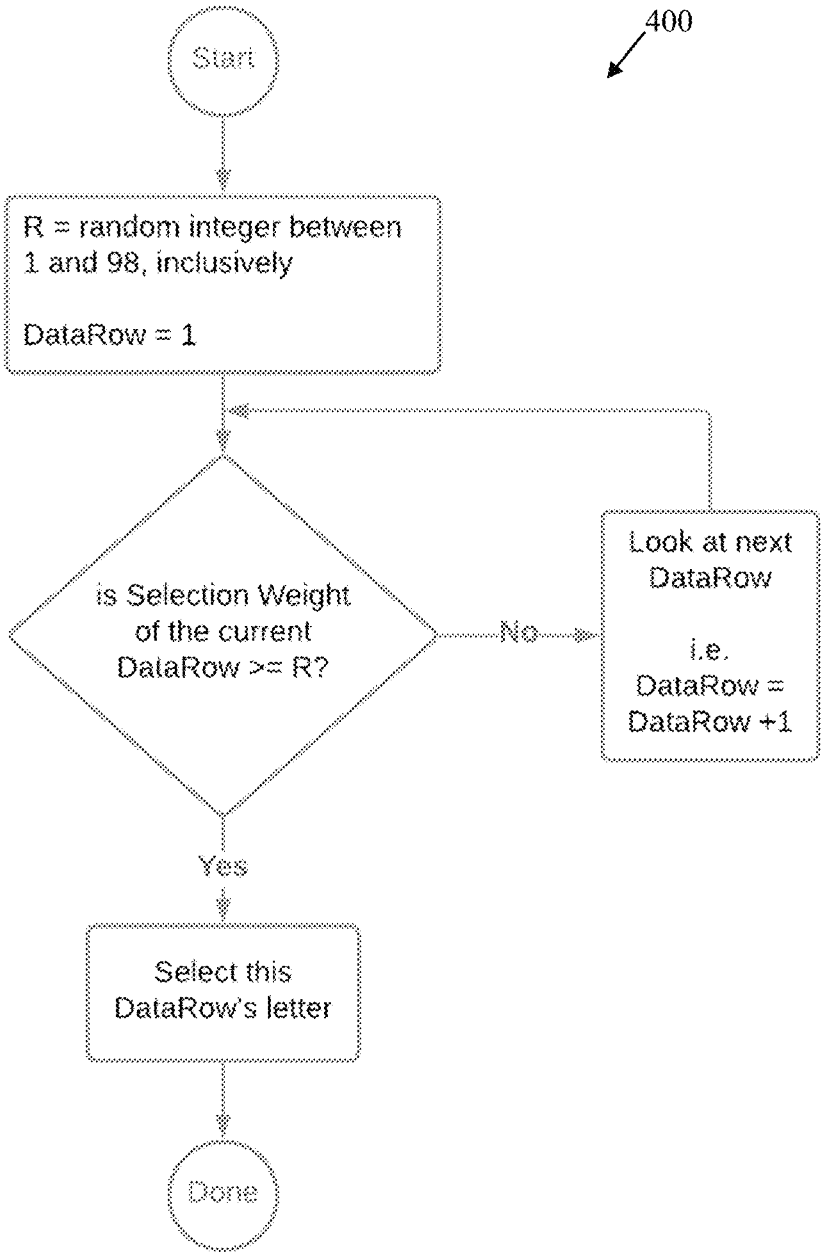
FIG. 15 provides a flow chart illustrating a process employed by some embodiments of the invention.
Figure 16:
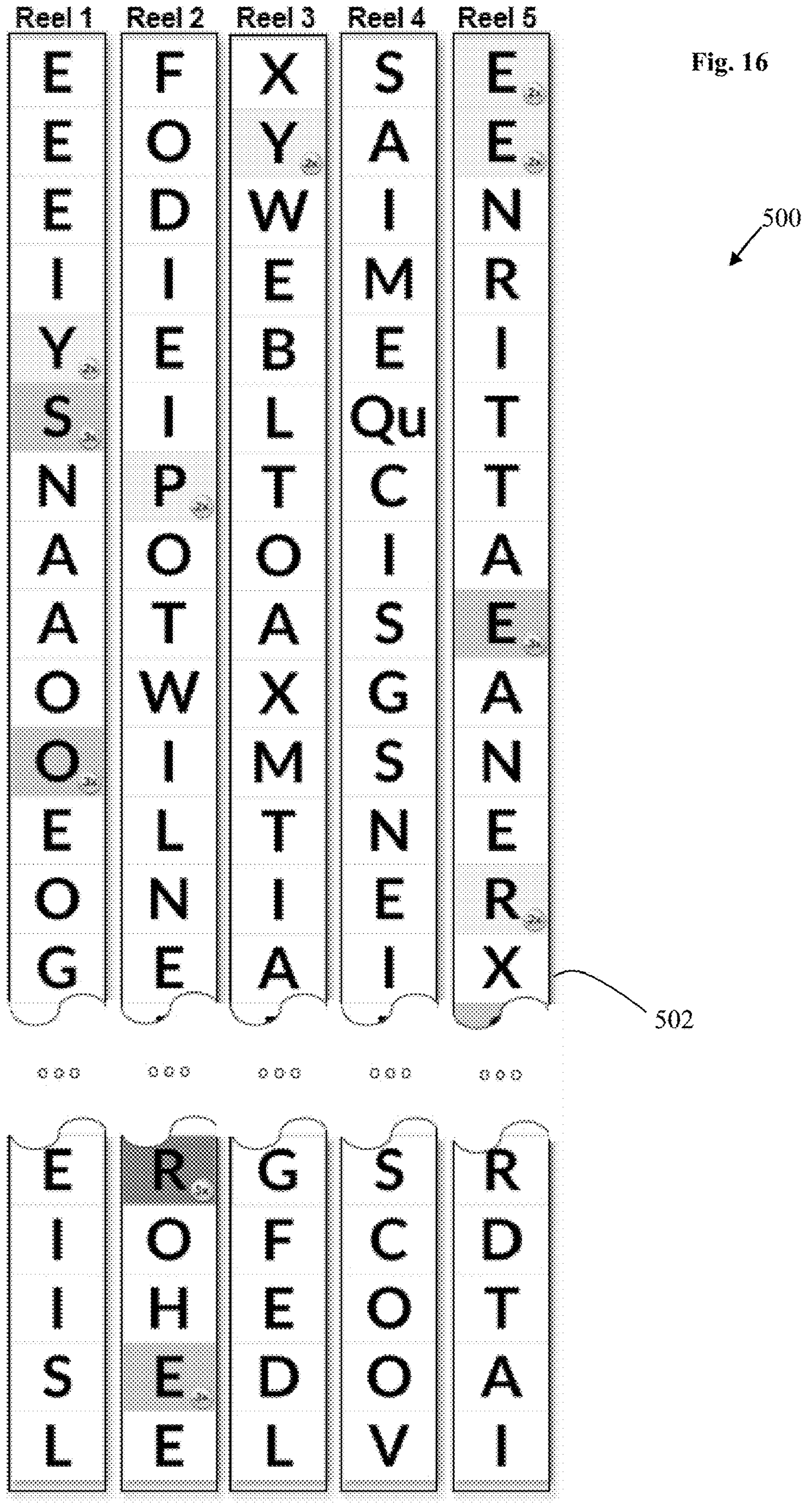
FIG. 16 provides exemplary sections of reel strips which may be incorporated in some embodiments of the invention.

In some other embodiments, Pre-Filtered Outcomes are formed by the random selection of sections of slot-machine style reel strips, For example, FIG. 15 depicts an embodiment 500 illustrating an example set of top sections and bottom sections of indefinitely long reel strips 502 containing Primary-Indicia on every Game-Element position and some Phrase-Score Multiplier Secondary-Indicia. Such reel strips can be created via some automated process, or via purely human design, or some combination such as having a human modify assignments originally created by a computer algorithm. In some variations, bonus-triggering icon Secondary-Indicia are assigned at a later point of time after filtering, for example, such as immediately after filtering is completed, such as after filtering is completed for a given Pre-Filtered Outcome or is completed for all Pre-Filtered Outcomes, etc.

In other embodiments not shown, both Phrase-Score Multiplier Secondary-Indicia and Bonus Triggering icon Secondary-Indicia are both pre-assigned to reel strips prior to Pre-Filtered Outcome generation. In yet some other embodiments not shown, only Bonus Event triggering icon Secondary-Indicia are pre-assigned to reel strips prior to Pre-Filtered Outcome generation. And in some other embodiments not shown, only Primary-Indicia are assigned prior to the generation of Pre-Filtered Outcomes.

The above example Game-Outcome generation methods can be described as Game-Element-driven insofar as (1) Game-Elements are randomly selected; (2) Game Outcomes are generated by filtering Pre-Filtered Outcomes; and (3) the Game Outcome is evaluated relative to game rules and Paytable, identifying and quantifying winning outcomes. The available payout or lack thereof is a result or product of the process.

In some embodiments not shown, a Results-Driven mechanism is employed. In these embodiments, for each Game-Outcome, the payout outcome is first randomly or deterministically selected and then the appropriate Game-Elements are selected. In some variations, the payout outcome initially selected is the total (available) payout amount. This is followed by a more complicated process that randomly selects which combination of game results whose sum total matches the required value. In some other variations, a random or deterministic number of Game-Phrases is selected, then Game-Phrases of the appropriate length are randomly selected from the Phrase-Dictionary. The system then assigns the Game-Tiles from selected Game-Phrases to a new outcome Tile-Grid. All other Game-Tile positions are randomly assigned Game-Elements. Then one or more filtering passes are conducted, with changes to any of the random Game-Elements applied until the Game-Outcome is acceptable. In some variations, Secondary-Indicia are explicitly assigned to the Game-Phrase Game-Elements, and then randomly or semi-randomly assigned to the random Game-Elements. In some other variations, Secondary-Indicia are randomly assigned to all Game-Elements. In some embodiments, when a losing outcome is the target, then a Game-Element driven method is applied until a non-winning result is generated.

In some variations involving Pre-Defined Outcomes, there is an additional step: (4) payout distribution filtering. In some embodiments not shown, Pre-Defined Outcomes are explicitly selected for inclusion and/or selected for exclusion from the total pool of final Pre-Defined Outcomes in order to achieve a particular overall expected RTP. In some embodiments not shown, Pre-Defined Outcomes are explicitly selected for exclusion from the total pool of final Pre-Defined Outcomes in order to avoid payouts of specific amounts such as payout values which correspond to what some players consider to be an "unlucky" number. Pre-Defined Outcomes are explicitly selected for inclusion and/or selected for exclusion from the total pool of final Pre-Defined Outcomes in order to assure that N (integer value of 0 or higher) number of payouts with a value within a particular range of values. For example, the exclusion of all payouts greater than 10000, and allowing only a maximum of two Pre-Defined Outcomes whose payout value is between 5000 and 10000, inclusively.

In some embodiments not shown, and relative to the particular game and game rules, outcome generation includes the selection from a plurality of control choices including choices of (a) Game-Element selection control data; (b) Phrase-Dictionaries; (c) Exclusion-Dictionary; (d) Valid-Directions; (e) Secondary-Indicia selection control data; (f) Game-Grid dimensions; (g) and other appropriate choices.

Community Bonus Example 1

In some embodiments of the present invention, a Community Bonus-Event is available to be concurrently played by a plurality of players. A typical implementation for Community-Bonus-Events allows for any number of players playing at a contiguous bank of games all offering the same Community-Bonus-Event opportunity. In some embodiments, the same type of game with respect to game rules, paytable, and game art are available at each of the game positions within the same bank. In some embodiments, more than one type of game is available within the same bank.

In physical casinos, a bank is typically comprised of four EGMs or game play stations, though specialized banks of 6 or 8 can occasionally be found. In some video-based casinos, such as in the Pop Slots social casino, banks of EGMs are virtually depicted, and there are usually quite a few players at any given virtual bank, whether an actual player or a system-controlled "bot" player substitute.

In some embodiments, the Community Bonus-Event Tile-Grid is always or almost always visible above or otherwise near the bank of games linked to that Community-Bonus-Event. In some other embodiments, the Community Bonus-Event Tile-Grid only appears at certain times such as when a player earns a Tile (discussed below) or especially when the Community Bonus-Event game is being played.

In some embodiments, only players who have made a bet within a certain time period prior to the start of the Community Bonus-Event are eligible to partake in and enjoy winning from that play of the Community-Bonus-Event. In some embodiments, only players who have achieved a certain qualifying event, such as earning a tile, or such as having placed a certain number of wagers, are eligible to partake in and enjoy winning from that play of the Community-Bonus-Event. For video-based casinos which can associate each player's play history with the actual player, a Community Bonus-Event can still earn payouts for a qualifying player even if the player has signed out of the casino, In some embodiments, each player who participated in a Community Bonus-Event is paid relative to some bonus bet basis. In some variations, the bonus bet basis is the player's last bet size. In some variations, the bonus bet basis is some average or on the totality of the player's bets either since the previous bonus or since the player began playing, whichever occurred last. In some variations, the bonus bet basis is based on qualifying events prior to the bonus play which may or may not also depend upon the size of the bet placed when each qualifying event occurred. In some embodiments, the bonus bet basis is alternately or additionally dependent upon the player's speed of play.

In some embodiments, the player can earn a qualifying event during regular game play. In some variations, a qualifying event is based upon a specific type of outcome such as an outcome with a certain number of a certain type of Primary and/or Secondary-Indicia. In some variations, a qualifying event is based upon the number of games played. In some variations, a qualifying event is based upon the number and/or the number of games played. In some variations, a qualifying event is based upon a certain number of a certain type of main game result occurring, such as a player getting three winning outcomes in a row, or such as when a player gets a fifth losing outcome since the start of play, since the end of previous Community-Bonus-Event, and/or since the last qualifying event occurred.

In some embodiments, a qualifying event makes the corresponding player eligible to participate in the next Community-Bonus-Event. In some embodiments, a qualifying event increases the bonus bet basis. In some embodiments, one or more Game-Tiles on the Community Tile-Grid are associated with a player, such as by coloring said associated Game-Tile with a color unique to the player's play position within the bank, or such as adding a player-specific or play position icon to said associated Game-Tile. In some embodiments, especially for land-based EGM implementation, a player can exchange their qualifying events, such as forfeiting earned Game-Tiles for a direct payout or an immediate secondary determination which can award a payout. This is to prevent a given player who is unwilling or unable (due to lack of funds) to continue playing from losing the entirety of the potential value of their qualifying events.

In some embodiments, at the start of a new Community-Bonus-Event, one or more rounds of community play are automatically played on the Community Bonus-Event Tile-Grid. In some variations, the Game-Tiles used in the first game were displayed after the end of the previous Community-Bonus-Event. In some other variations, the Game-Tiles used in the first game are displayed at the start of a new Community-Bonus-Event.

In some embodiments, eligible players earn payouts for each Demarked Game-Phrase relative to that player's bonus bet basis. In some embodiments, eligible players earn payouts, or additional payouts, for Demarked Game-Phrases that contain one or more Game-Tiles associated with that player. In some variations, when a player-associated Game-Tile leads to the corresponding player receiving a payout, the player-associate is removed from further play. In some variations, when a player-associated Game-Tile leads to the corresponding player receiving a payout, the player-associate Game-Tile remains available for the duration of that Community-Bonus-Event. In some variations, all player-associated Game-Tiles are reset at the end of each Community-Bonus-Event. In some other variation, only player-associated Game-Tiles which resulted in one or more awards are reset.

In some embodiments, the payout or additional payout associated with Demarked Game-Phrases that contain one or more Game-Tiles associated with that player is a multiplier applied to payout of that particular Game-Phrase. the payout or additional payout associated with Demarked Game-Phrases that contain one or more Game-Tiles associated with that player is a multiplier applied to all future payouts within the same Community-Bonus-Event. In some embodiments, the payout or additional payout associated with Demarked Game-Phrases that contain one or more Game-Tiles associated with that player is a multiplier applied to the entirety of said players Community Bonus-Event payouts. In some embodiments, the payout or additional payout associated with Demarked Game-Phrases that contain one or more Game-Tiles associated with that player is a fixed payout or variable payout. In many embodiments, the value of some or all of the above payouts depends upon the size of the bet placed when the Game-Tile was originally associated with said player.

In some embodiments, the player with the highest Community Bonus-Event payout is awarded an additional payout. In some embodiments, the player with the most number of redeemed player-associated Game-Tiles is awarded an additional payout. In some embodiments, the player with the valuable redeemed player-associated Game-Tiles is awarded an additional payout.

In some embodiments, a Community Bonus-Event is triggered based upon a hidden-from-the-player secondary determination. In some variations, each secondary determination is independent of all prior secondary determinations. In some other variations, the chance of a secondary determination triggering a Community Bonus-Event increases based on the number of prior failed secondary determinations since the last Community-Bonus-Event. In some embodiments, said secondary determination occurs each time a bet on a game within the corresponding bank of games is made. In some variations, the chance of a said secondary determination triggering a Community Bonus-Event increases with bet size. In some embodiments, a Community Bonus-Event is triggered after a certain number of games have been played. In some embodiments, a Community Bonus-Event is triggered after a certain sum of total bets is placed. In some embodiments, a Community Bonus-Event is triggered after a certain amount of elapsed time. In some embodiments, the Community Bonus-Event is triggered based upon a certain main game outcome on one of the games in the corresponding bank.

General Implementation Example 1

In some embodiments, game outcome generation and filtering are performed during a given game's design and development. For example, initial game developer steps can include: determining fundamental gameplay parameters such as the Paytable details, the size, and arrangement of Game-Tiles, the specific Valid-Directions, the mechanism and control data for the assignment of Primary-Indicia to the Game-Tiles of Pre-Filtered Outcomes; creating and executing software to create Pre-Filtered Outcomes; determining fundamental filtering rules such as creating a Phrase-Dictionary, creating an Exclusion-Dictionary, selecting the filtering process mechanics such as excluding text patterns which are found in the Phrase-Dictionary but are aligned other than along a Valid-Direction; and/or creating and executing software to filter out Pre-Filtered Outcomes into viable game outcomes.

In some embodiments, Secondary-Indicia are assigned to Game-Tiles as part of the creation of Pre-Filtered Outcomes. In some other embodiments, Secondary-Indicia are only assigned to the Game-Tiles in post-filtered viable game outcomes. In some embodiments, Secondary-Indicia are only assigned to Game-Tiles on the EGM after the player has started the play of a new game.

In some embodiments, all of the Pre-Filtered Outcomes are batch generated before they are batch filtered. In some embodiments, a given Pre-Filtered Outcome is filtered immediately after it is generated but before the next Pre-Filtered Outcome is generated.

In some embodiments, when the filtering process identifies a violation of a filter rule, the Pre-Filtered Outcome is discarded, and a replacement Pre-Filtered Outcome is generated. In some embodiments, when the filtering process identifies a violation of a filter rule, at least one of the letters responsible for the rule violation is changed, and the filtering process is repeated.

In some embodiments, a game developer also creates and executes payout analysis software which identifies the available Game-Phrases and stores this data along with the game outcome data. In some variation, said payout software also calculates payout components such as Total-Payouts, Phrase-Score, Phrase-Payouts, etc., and stores this data along with the game outcome data.

Regardless of the specific processes and types of data, outcome data created at game development time, the outcome data needs to be incorporated into the EGM software. For online-based gaming and other network gaming, the incorporation of outcome data and execution data occurs as part of the creation of the game's final executable software. For land-based EGMs, an additional step is required by many gaming regulatory agencies, which is the burning of a game's final executable software on a Read-Only-Memory (ROM) data storage device, to which a physical serial number is typically affixed. Such a game software ROM must be physically inserted into the appropriate socket of EGM computer hardware for said EGM to operate.

General Implementation Example 2

In some embodiments, game outcome generation, outcome filtering, and the play and display of game outcomes all happen on the same device, typically a Class III EGM or on the server component of a Class III networked EGM. Assorted development steps, As with the General Implementation Example 1, comparable development steps are required to create the final software executable, steps such as determining the game configuration, Paytable, game outcome generation control parameters, outcome filtering control parameters, etc.

Irrespective of EGM hardware configuration, and irrespective of whether or not game outcome generation occurs immediately before said outcome is played and displayed, as a gambling game, it is typically required for the expected RTP to be calculated. In some embodiments, the expected RTP for a given game (relative to a specific set of defining game parameters) is calculated via the use of analysis software that models the operation of said game. In some embodiments, the expected RTP for a given game (relative to a specific set of defining game parameters) is calculated via the use of an EGM set up for operation of said game. In some embodiments, the expected RTP for a given game (relative to a specific set of defining game parameters) is calculated executing said game on an EGM capable of providing the appropriate game result metrics, In some embodiments, the expected RTP for a given game (relative to a specific set of defining game parameters) is calculated via a combination of the above two approaches.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device and implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

In some embodiments, the methods, systems, and media disclosed herein include at least one computer program, or use of the same. A computer program includes a sequence of instructions, executable in the digital processing device's CPU, written to perform a specified task. In some embodiments, a computer program includes a web application. In light of the disclosure provided herein, those of skill in the art will recognize that a web application, in various embodiments, utilizes one or more software frameworks and one or more database systems. In some embodiments, a computer program includes a mobile application provided to a mobile digital processing device. In some embodiments, a computer program includes a standalone application, which is a program that is run as an independent computer process, not an add-on to an existing process, e.g., not a plug-in. In some embodiments, the computer program includes a web browser plug-in.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. In some embodiments, these computer readable program instructions may be provided to a processor of a general purpose computer specialized to provide some or all of the features herein, special purpose computer, or other programmable data processing apparatus to produce a machine, such that the instructions, which execute via the processor of the computer or other programmable data processing apparatus, create means for implementing the functions/acts specified herein, or in the flowchart and/or block diagram block or blocks.

Those skilled in the art will appreciate that the order of execution or performance of the operations in the embodiments of the invention illustrated and described herein may not be essential unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

It will be apparent to persons skilled in the art that numerous variations and/or modifications may be made to the present invention as shown in the specific embodiments without departing from the spirit or scope of the invention as broadly described. The above described embodiments are intended to illustrate the principles of the invention, but not to limit the scope of the invention.

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention and also to enable any person skilled in the art to practice the invention, including making and using any devices or systems and performing any incorporated methods, and may include other examples that occur to those skilled in the art. Other aspects and features of the invention can be obtained from a study of the drawings, the disclosure, and the appended claims.

Those skilled in the art will readily appreciate that the systems and methods described herein may be a standalone system or incorporated in an existing system or device. Systems of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as users, content providers and operators thereof are provided with useful access thereto, either through a mobile device, system, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A system of providing a wagering game in which at least some payout is based on a formation of letter patterns that match entries in a dictionary of winning letter patterns, the system comprising:

a display device;

a user interface for receiving player inputs;

a first processor configured for game outcome generation and random number generation;

a first tangible memory for storage of game outcome data;

a first tangible, non-transitory, memory configured to communicate with the first processor, said first tangible, non-transitory, memory having instructions stored thereon in response to execution by the first processor, cause the first processor to perform operations comprising:

selecting at random a plurality of letters;

associating the selected plurality of letters with a plurality of letter display elements;

evaluating said association of letters relative to filtering rules for a plurality of acceptable game outcomes;

responding to a result of said evaluation of filtering rules;

responsive to identifying an acceptable game outcome of the plurality of acceptable game outcomes, storing game outcome data into said first tangible memory;

a second processor configured for gameplay; and a second memory for storing game outcome data;

a second tangible, non-transitory, memory configured to communicate with the second processor, said second tangible, non-transitory, memory having instructions stored thereon in response to execution by the second processor, cause the second processor to perform operations comprising:

maintaining a player balance of funds available for wagering;

receiving a request to begin play;

deducting a value of a bet placed from said player balance;

displaying a game outcome;

evaluating said game outcome for one or more first payout patterns;

if said game outcome has no said one or more first payout patterns, displaying a corresponding message to the player and ending the wagering game;

else proceeding with a demarcation of said one or more first payout patterns, calculating earned payouts;

updating said player balance accordingly; and displaying a corresponding message to the player and ending the wagering game, wherein said second processor performs a process of evaluating one or more Secondary-Indicia on said display elements and wherein said evaluating one or more Secondary-Indicia results in the activation of a secondary event.

2. The system of claim 1 wherein said first processor and its corresponding first tangible, non-transitory, memory and said second processor and its corresponding second tangible, non-transitory, memory are located in a single computer cabinetry.

3. The system of claim 1 wherein said first processor and its corresponding first tangible, non-transitory, memory and said second processor and its corresponding second tangible, non-transitory, memory are located in one or more separate computer cabinetries.

4. The system of claim 1 wherein said game outcome generation is completed prior to receiving said request to play.

5. The system of claim 1 wherein said game outcome generation is completed after receiving said request to play.

6. The system of claim 1 wherein said evaluating one or more Secondary-Indicia results in an increase in said earned payouts.

7. The system of claim 1 wherein said first processor further performs a process of associating a Secondary-Indicium to at least one display element.

8. The system of claim 1 wherein said filtering rules further comprises at least one of the following:

exclusion of letter patterns found in an exclusion dictionary;

exclusion of letter patterns forming inadvertent text;

exclusion of letter patterns based on directional ambiguity;

exclusion of letter patterns based on word-length ambiguity; and exclusion of game outcomes based on their total payout value.

9. The system of claim 1 wherein said first processor also performs the process of:

identifying the presence of the one or more first payout patterns along the display elements relative to a first dictionary of payout-eligible phrases; and storing additional data regarding said one or more payout patterns with the game outcome data stored for said game outcome.

10. The system of claim 9 wherein said second processor performs the process of evaluating said game outcome for the one or more a first payout pattern based upon additional data stored with said game outcome.

11. The system of claim 1 wherein said second processor performs said demarcation of said one or more first payout patterns without additional player input.

12. The system of claim 11 wherein the said system selects an order in which payout patterns are demarked relative to specific ordering rules.

13. The system of claim 12 wherein said specific ordering rules are based on a positioning of the payout patterns on the display elements relative to an outside boundary of the display elements.

14. The system of claim 12 wherein said specific ordering rules are based on reducing an overall distance between the payout patterns.

15. The system of claim 1 wherein said second processor performs a process of displaying a list of text of an available payout text, and said demarcation of said one or more first payout patterns if and as directed by the player by accepting inputs from said player user interface.

16. The system of claim 1 wherein the second memory is comprised of hardware used for the first tangible memory.

17. The system of claim 1 wherein said gameplay performed by said second processor is a primary gaming proposition.

18. The system of claim 1 wherein said gameplay performed by said second processor is a secondary gaming proposition bonus associated with a different primary gaming proposition.

19. The system of claim 18 wherein said different primary gaming proposition is a slot game.

20. The system of claim 18 wherein said different primary gaming proposition is a video poker game.

21. The system of claim 18 wherein said different primary gaming proposition is a video keno game.

22. The system of claim 18 wherein said secondary gaming proposition bonus generates payouts for a plurality of players.

23. A system of providing a wagering game in which at least some payout is based on a formation of letter patterns that match entries in a dictionary of winning letter patterns, the system comprising:

a display device;

a user interface for receiving player inputs;

a first processor configured for game outcome generation and random number generation;

a first tangible memory for storage of game outcome data;

a first tangible, non-transitory, memory configured to communicate with the first processor, said first tangible, non-transitory, memory having instructions stored thereon in response to execution by the first processor, cause the first processor to perform operations comprising:

selecting at random a plurality of letters;

associating the selected plurality of letters with a plurality of letter display elements;

evaluating said association of letters relative to filtering rules for a plurality of acceptable game outcomes;

responding to a result of said evaluation of filtering rules;

responsive to identifying an acceptable game outcome of the plurality of acceptable game outcomes, storing game outcome data into said first game outcome memory;

a second processor configured for gameplay; and a second memory for storing game outcome data;

a second tangible, non-transitory, memory configured to communicate with the second processor, said second tangible, non-transitory, memory having instructions stored thereon in response to execution by the second processor, cause the second processor to perform operations comprising:

maintaining a player balance of funds available for wagering;

receiving a request to begin play;

deducting a value of a bet placed from said player balance;

displaying a game outcome;

selecting a game outcome from said second memory;

evaluating said game outcome for the presence of one or more first payout patterns;

if said game outcome has no said one or more first payout patterns, displaying a corresponding message to the player and ending the wagering game;

else proceeding with a demarcation of said one or more first payout patterns, calculating earned payouts;

updating said player balance accordingly; and displaying a corresponding message to the player and ending the wagering game, wherein said second processor performs a process of displaying a list of text of an available payout text, and said demarcation of said one or more first payout patterns if and as directed by the player by accepting payout pattern demarcation input from said player user interface and wherein the system limits an amount of time available for accepting payout pattern demarcation input from the player, where after said amount of time available is expired, the system stops accepting payout pattern demarcation input from the player and proceeds with the process of calculating said earned payouts relative to the one or more first payout patterns successfully demarked.

* * * * *